(12) United States Patent
Shestak et al.

(10) Patent No.: US 7,760,430 B2
(45) Date of Patent: Jul. 20, 2010

(54) 2D-3D SWITCHABLE AUTOSTEREOSCOPIC DISPLAY APPARATUS

(75) Inventors: Sergey Shestak, Suwon-si (KR); Dae-sik Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1030 days.

(21) Appl. No.: 11/429,257

(22) Filed: May 8, 2006

(65) Prior Publication Data
US 2007/0008617 A1    Jan. 11, 2007

(30) Foreign Application Priority Data
Jul. 7, 2005    (KR) .................. 10-2005-0061188

(51) Int. Cl.
  *G02B 27/26*    (2006.01)
  *G02B 27/22*    (2006.01)
(52) U.S. Cl. .................. 359/465; 359/463; 359/462
(58) Field of Classification Search .......... 359/465, 359/462, 463; 348/51, 55
See application file for complete search history.

(56) References Cited

U.S. PATENT DOCUMENTS

| | | | |
|---|---|---|---|
| 5,500,765 A | | 3/1996 | Eichenlaub |
| 6,069,650 A | * | 5/2000 | Battersby .................. 348/59 |
| 6,157,424 A | | 12/2000 | Eichenlaub |
| 7,245,430 B2 | * | 7/2007 | Kobayashi et al. .......... 359/464 |
| 7,375,784 B2 | * | 5/2008 | Smith et al. .................. 349/129 |
| 2002/0113911 A1 | | 8/2002 | Fukuda |
| 2006/0139759 A1 | | 6/2006 | Hashimoto et al. |

FOREIGN PATENT DOCUMENTS

| | | |
|---|---|---|
| DE | 10025226 A1 | 11/2001 |
| EP | 1291705 A2 | 3/2003 |
| EP | 1394593 A1 | 3/2004 |
| GB | 2403814 A | 1/2005 |
| JP | 09-203980 A | 8/1997 |
| JP | 2004-139054 A | 5/2004 |

\* cited by examiner

*Primary Examiner*—Audrey Y Chang
(74) *Attorney, Agent, or Firm*—Sughrue Mion, PLLC

(57) ABSTRACT

A two-dimensional/three-dimensional (2D/3D) switchable autostereoscopic display apparatus is provided, including a display panel and a lenticular unit with a two-dimensional mode and a three-dimensional mode. In the two-dimensional mode, the lenticular unit transmits a single image, and in the three-dimensional mode, the lenticular unit separates an image from the display panel into a right-eye image and a left-eye image. The lenticular unit includes first and second lenticular lens sheets, a half-wave plate interposed between the first and second lenticular lens sheets, which rotates a polarization of incident light by 90 degrees, and first and second electro-optical mediums disposed between the first lenticular lens sheet and the half-wave plate and between the second lenticular lens sheet and the half-wave plate, respectively. First and second electro-optical media have refractive indices with respect to extraordinary rays that vary based on electric fields applied to the first and second electro-optical media.

26 Claims, 15 Drawing Sheets

2D-3D SWITCHABLE AUTOSTEREOSCOPIC DISPLAY APPARATUS

CROSS-REFERENCE TO RELATED PATENT APPLICATIONS

This application claims priority from Korean Patent Application No. 10-2005-0061188, filed on Jul. 7, 2005, in the Korean Intellectual Property Office, the disclosure of which is incorporated herein in its entirety by reference.

BACKGROUND OF THE INVENTION

1. Field of the Invention

Apparatuses and methods consistent with the present invention relate to a 2D-3D switchable autostereoscopic display apparatus which is compatible with a display panel that generates polarized light and with a display panel that generates non-polarized light.

2. Description of the Related Art

Stereoscopic display apparatuses display images having binocular parallax for a left eye and for a right eye to the left and right eyes of a viewer, respectively. The viewer can see a stereoscopic 3D image by perceiving the images for the left and right eyes provided by the stereoscopic display apparatus through the retinas of different eyes. Such stereoscopic display apparatuses are roughly classified into parallax barrier type stereoscopic display apparatuses and lenticular stereoscopic display apparatuses. Generally, lenticular stereoscopic display apparatuses include a display panel for producing an image signal for a right eye and an image signal for a left eye and a lenticular means installed in front of the display panel to direct the image for a left eye and the image for a right eye in mutually different directions.

There is recent demand for a stereoscopic display apparatus capable of switching between a 2D mode and a 3D mode to selectively display either a 2D image or a 3D image according to an image signal provided. To meet this demand, various 2D/3D switchable autostereoscopic display apparatuses are under development. For example, U.S. Pat. No. 5,500,765 discloses an autostereoscopic display apparatus which switches between a 2D mode and a 3D mode by a mechanical movement of a lenticular lens sheet over a display panel. However, such a mechanical switching means is vulnerable to damage from the environment, such as through impacts, vibrations, dust, humidity, etc.

To solve this problem, U.S. Pat. No. 6,069,650 discloses an autostereoscopic display apparatus which switches between a 2D mode and a 3D mode using an electro-optical medium. FIG. 1 is a cross-sectional view of the autostereoscopic display apparatus disclosed in U.S. Pat. No. 6,069,650. Referring to FIG. 1, the conventional autostereoscopic display apparatus includes a back-light unit 81, a liquid crystal display (LCD) panel 82, and a lenticular means 83 which switches between a 2D mode and a 3D mode. The lenticular means 83 includes a lenticular lens sheet 85 on which a plurality of cylindrical lenses are arranged, a flat-surfaced plate 86 facing the lenticular lens sheet 85, an electro-optical medium 84 filling the space between the lenticular lens sheet 85 and the flat-surfaced plate 86, and electrodes 88 and 87 respectively formed on inner sides of the lenticular lens sheet 85 and the flat-surfaced plate 86. According to this structure, when no voltages are applied to the two electrodes 88 and 87, the stereoscopic display apparatus operates in a 3D mode. When voltages are applied to the two electrodes 88 and 87, the stereoscopic display apparatus operates in a 2D mode.

However, in the conventional stereoscopic display apparatus of FIG. 1, only the refractive index of the electro-optical medium 84 with respect to polarized extraordinary light is controllable. Hence, the electro-optical medium 84 can only be applied to LCD panels, not to display panels that generate non-polarized light, such as, cathode ray tubes (CRTs), plasma display panels (PDPs), organic light emitting devices (OLEDs), field emission devices (FEDs), etc.

FIGS. 2A and 2B are cross-sectional views illustrating different operations of the lenticular means 83 with respect to incident non-polarized light. Typically, non-polarized light incident upon a liquid crystal material is output as two separate rays, namely, ordinary rays and extraordinary rays, polarized perpendicular to one another. In FIGS. 2A and 2B, rays having vertical lines thereon denote ordinary rays, and rays having dots thereon denote extraordinary rays. Referring to FIG. 2A, when no electric fields exist, molecules of the electro-optical medium 84 are arranged parallel to the plate 86. The lenticular lens sheet 85 is formed of a material having the same refractive index as the electro-optical medium 84 with respect to the ordinary rays. The electro-optical medium 84 is formed of a material having a lower refractive index with respect to extraordinary rays than to ordinary rays. Thus, when no voltages are applied to the two electrodes 88 and 87, the lenticular lens sheet 85 does not serve as a lens for the ordinary rays, and thus the ordinary rays are transmitted by the lenticular means 83 without being refracted. On the other hand, the extraordinary rays are refracted by the lenticular lens sheet 85 and simultaneously directed as separate images for a left eye and a right eye to the two eyes of a viewer.

Thus, when non-polarized light is incident upon the conventional lenticular means 83 in a 3D mode, some rays of the incident non-polarized light are directed in different directions toward a viewer's eyes so that a viewer sees a different image in each eye, while the other rays are directed toward the viewer's eyes so that the viewer sees both images with each eye. As a result, proper 3D image perception is impossible. In order to prevent improper 3D image perception, a polarization plate must be installed between the display panel and the lenticular means. However, this measure reduces the brightness of the display apparatus by at least 50%.

SUMMARY OF THE INVENTION

The present invention provides a 2D-3D switchable autostereoscopic display apparatus that easily switches between a 2D mode and a 3D mode.

The present invention also provides a 2D-3D switchable autostereoscopic display apparatus which can compatibly use a display panel that generates polarized light and a display panel that generates non-polarized light.

According to an exemplary aspect of the present invention, there is provided a two-dimensional/three-dimensional (2D/3D) switchable autostereoscopic display apparatus including: a display panel which provides an image and a lenticular unit. The lenticular unit includes: a first lenticular lens sheet and a second lenticular lens sheet disposed so that lens sides of the first and second lenticular lens sheets face each other; a half-wave plate interposed between the first and second lenticular lens sheets, which rotates a polarization of an incident light beam by 90 degrees; a first electro-optical medium and a second electro-optical medium disposed in a space between the first lenticular lens sheet and the half-wave plate and a space between the second lenticular lens sheet and the half-wave plate, respectively; and transparent electrodes applying electric fields to the first and second electro-optical media. The first and second electro-optical media have refractive indices, which respect to extraordinary rays, that vary according to whether or not electric fields are applied to the first and second electro-optical media. The lenticular unit has a two-dimensional mode and a three-dimensional mode. In the two-dimensional mode, the lenticular unit transmits the image from the display panel as a single image, and in the three-dimensional mode, the lenticular unit separates the image from the display panel into a right-eye image and a left-eye image.

The refractive indices of the first and second electro-optical media with respect to ordinary rays may be substantially the same as the refractive indices of the first and second lenticular lens sheets.

When no electric fields are applied to the first and second electro-optical media, the refractive indices of the first and second electro-optical media with respect to extraordinary rays may be lower than the refractive indices of the first and second electro-optical media with respect to ordinary rays. When electric fields are applied to the first and second electro-optical media, the refractive indices of the first and second electro-optical media with respect to extraordinary rays may be equal to the refractive indices of the first and second electro-optical media with respect to ordinary rays. In this case, the lens sides of the first and second lenticular lens sheets may be convex.

When no electric fields are applied to the first and second electro-optical media, the refractive indices of the first and second electro-optical media with respect to extraordinary rays may be higher than the refractive indices of the first and second electro-optical media with respect to ordinary rays. When electric fields are applied to the first and second electro-optical media, the refractive indices of the first and second electro-optical media with respect to extraordinary rays may be equal to the refractive indices of the first and second electro-optical media with respect to ordinary rays. In this case, the lens sides of the first and second lenticular lens sheets may be concave.

In a three-dimensional mode, when no voltage is applied to the transparent electrodes, ordinary rays of incident light pass through the first lenticular lens sheet without refraction and are then transformed into extraordinary rays by the half-wave plate and refracted by the second lenticular lens sheet. Extraordinary rays of the incident light are refracted by the first lenticular lens sheet and then transformed into ordinary rays by the half-wave plate 24. The ordinary rays pass through the second lenticular lens sheet without being refracted.

The transparent electrodes may include: first transparent electrodes formed on the lens side of the first lenticular lens sheet and on one side of the half-wave plate, which apply an electric field to the first electro-optical medium; and second transparent electrodes formed on the lens side of the second lenticular lens sheet and on the other side of the half-wave plate, which apply an electric field to the second electro-optical medium.

Each of the first and second lenticular lens sheets may include a transparent plate and a lenticular layer attached to the transparent plate.

The transparent electrodes may be interposed between the transparent plate and the lenticular layer of the first lenticular lens sheet and between the transparent plate and the lenticular layer of the second lenticular lens sheet so that electric fields are simultaneously applied to the first and second electro-optical media.

The half-wave plate may include a transparent plate and quarter-wave plates attached to both sides of the transparent plate.

The first and second electro-optical media may include nematic liquid crystal.

When no electric fields are applied to the nematic liquid crystal, the nematic liquid crystal may be oriented parallel to the polarization of ordinary rays and perpendicular to the polarization of extraordinary rays. When electric fields are applied to the nematic liquid crystal, the nematic liquid crystal may be oriented perpendicular to both the polarizations of the extraordinary and ordinary rays.

The display panel may be a panel selected from a liquid crystal display, a plasma display panel, an organic light emitting device, a field emission device, and a cathode ray tube.

According to another exemplary aspect of the present invention, there is provided a 2D/3D switchable autostereoscopic display apparatus including a display panel which provides an image and a lenticular unit. The lenticular unit includes: a first lenticular lens sheet and a second lenticular lens sheet disposed so that lens sides of the first and second lenticular lens sheets face each other; a transparent plate interposed between the first and second lenticular lens sheets; a first electro-optical medium and a second electro-optical medium disposed in a space between the first lenticular lens sheet and the transparent plate and a space between the second lenticular lens sheet and the transparent plate, respectively; and transparent electrodes which apply electric fields to the first and second electro-optical media. When no electric fields are applied to the first and second electro-optical media, the first electro-optical medium is oriented parallel to the polarization of ordinary rays and perpendicular to the polarization of extraordinary rays, and the second electro-optical medium is oriented perpendicular to the polarization direction of the ordinary rays and parallel to the polarization of the extraordinary rays. When electric fields are applied to the first and second electro-optical media, the first and second electro-optical media are oriented perpendicular to both the polarizations of the extraordinary and ordinary rays. The lenticular unit has a two-dimensional mode and a three-dimensional mode. In the two-dimensional mode, the lenticular unit transmits the image from the display panel as a single image, and in the three-dimensional mode, the lenticular unit separates the image from the display panel into a right-eye image and a left-eye image.

In a three-dimensional mode, when no voltage is applied to the transparent electrodes, ordinary rays of incident light pass through the first lenticular lens sheet without refraction and are then refracted by the second lenticular lens sheet, and extraordinary rays of the incident light are refracted by the first lenticular lens sheet and then pass through the second lenticular lens sheet without being refracted.

The transparent electrodes may be formed on lens sides of the first and second lenticular lens sheets and on both sides of the transparent plate.

According to another exemplary aspect of the present invention, there is provided a 2D/3D switchable autostereoscopic display apparatus including: a display panel which provides an image and a lenticular unit. The lenticular unit has a two-dimensional mode and a three-dimensional mode. In the two-dimensional mode, the lenticular unit transmits the image from the display panel as a single image, and in the three-dimensional mode, the lenticular unit separates the image from the display panel into a right-eye image and a left-eye image. The lenticular unit includes: a first flat-surfaced plate and a second flat-surfaced plate disposed in parallel and facing each other; a half-wave plate interposed between the first and second flat-surfaced plates, which rotates a polarization of an incident light beam by 90 degrees; a first electro-optical medium and a second electro-optical medium disposed in a space between the first flat-surfaced plate and the half-wave plate and a space between the second flat-surfaced plate and the half-wave plate, respectively; and an electrode structure which forms an electric field gradient having a symmetrical distribution within each of the first and second electro-optical media so that extraordinary rays of the light incident upon the lenticular unit are focused by the first and second electro-optical media. The first and second electro-optical media have refractive indices, with respect to extraordinary rays, that vary according to intensities of electric fields applied to the first and second electro-optical media.

The electrode structure may include planar transparent electrodes disposed over both sides of the half-wave plate, and a plurality of strip-shaped transparent electrodes arranged in parallel on an inner surface of each of the first and second flat-surfaced plates.

The electrode structure may include planar transparent electrodes disposed over both sides of the half-wave plate, and a plurality of curved transparent electrodes disposed in parallel in each of the first and second flat-surfaced plates.

The refractive indices of the first and second electro-optical media with respect to the extraordinary rays may be symmetrically distributed due to electric field gradients formed within the first and second electro-optical media.

When a voltage is applied to the electrode structure, ordinary rays of incident light pass through the first electro-optical medium without refraction and are then transformed into extraordinary rays by the half-wave plate and focused by the second electro-optical medium. Extraordinary rays of the incident light are focused by the first electro-optical medium and then transformed into ordinary rays by the half-wave plate. The ordinary rays pass through the second electro-optical medium without being refracted.

According to another exemplary aspect of the present invention, there is provided a 2D/3D switchable autostereoscopic display apparatus including an image producing means for producing an image and a lenticular means, having a two-dimensional mode and a three-dimensional mode. In the two-dimensional mode, the lenticular means is for transmitting the image from the image producing means as a single image, and in the three-dimensional mode, the lenticular means is for separating the image from the display apparatus into a right-eye image and a left-eye image. In the three-dimensional mode, all incident light forming the image from the image-producing means is separated into either the right-eye image or the left-eye image.

BRIEF DESCRIPTION OF THE DRAWINGS

The above and other exemplary aspects of the present invention will become more apparent by the following detailed description with reference to the attached drawings in which.

DETAILED DESCRIPTION OF EXEMPLARY EMBODIMENT OF THE INVENTION

Figure 1:
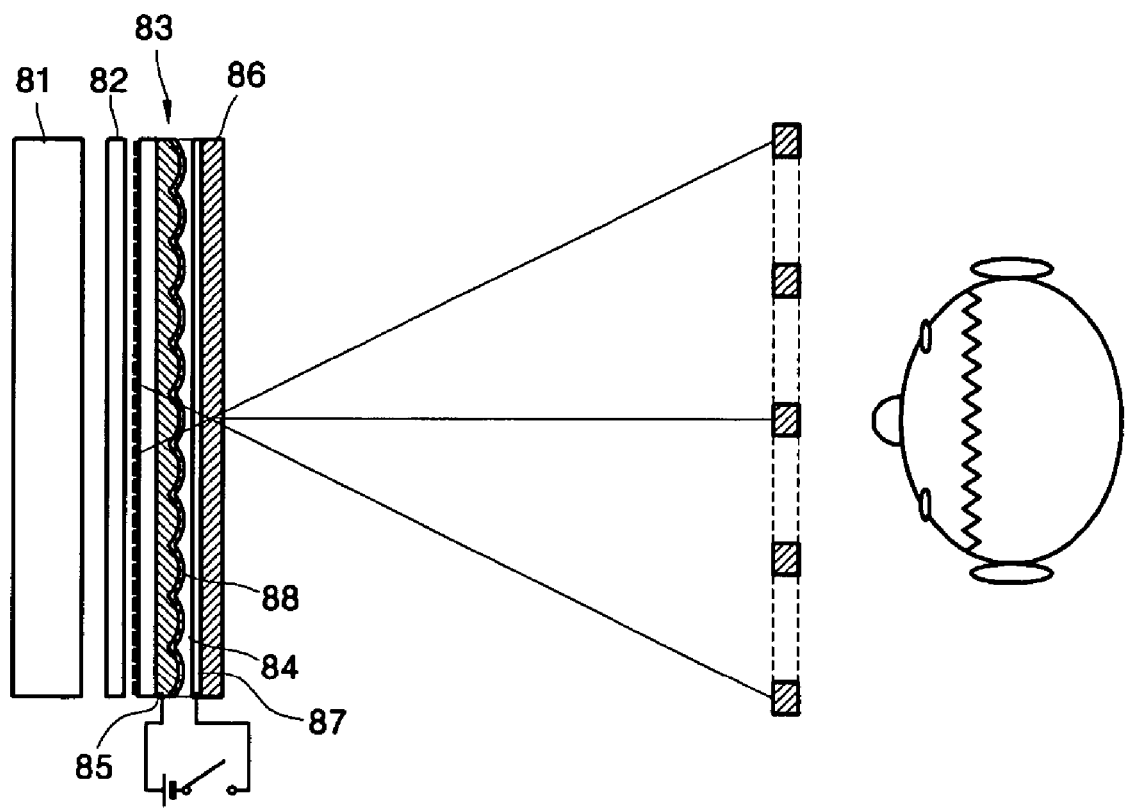
FIG. 1 schematically illustrates a conventional 2D/3D switchable autostereoscopic display apparatus.
Figure 2A:
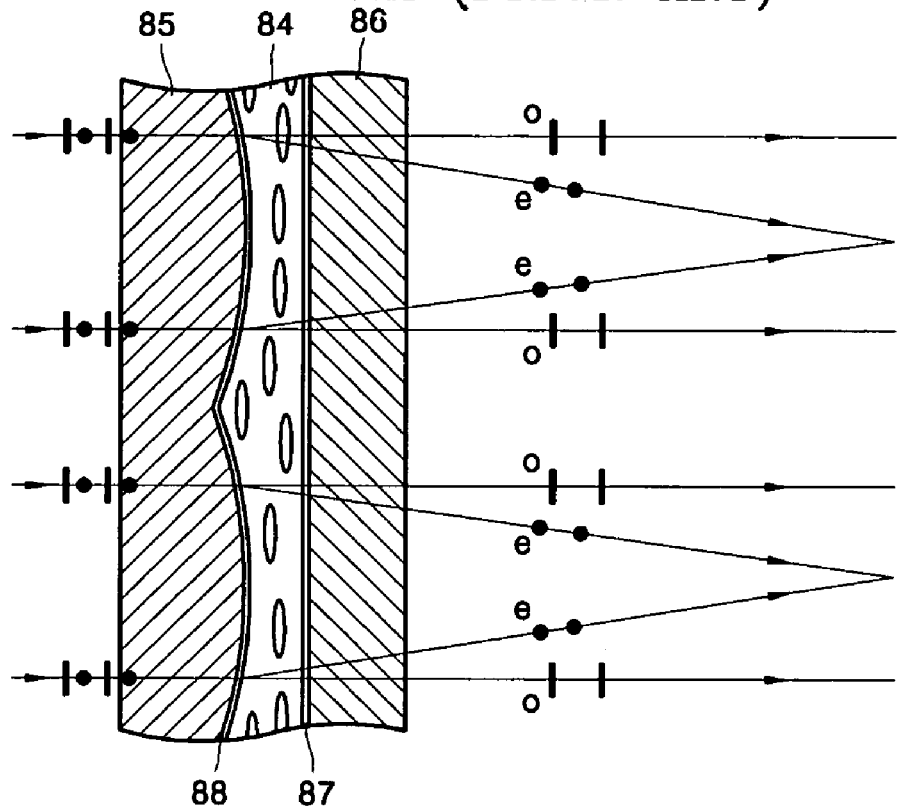
FIGS. 2A and 2B illustrate operations of a lenticular means in the conventional autostereoscopic display apparatus of FIG. 1 when non-polarized light is incident upon the lenticular means.
Figure 2B:
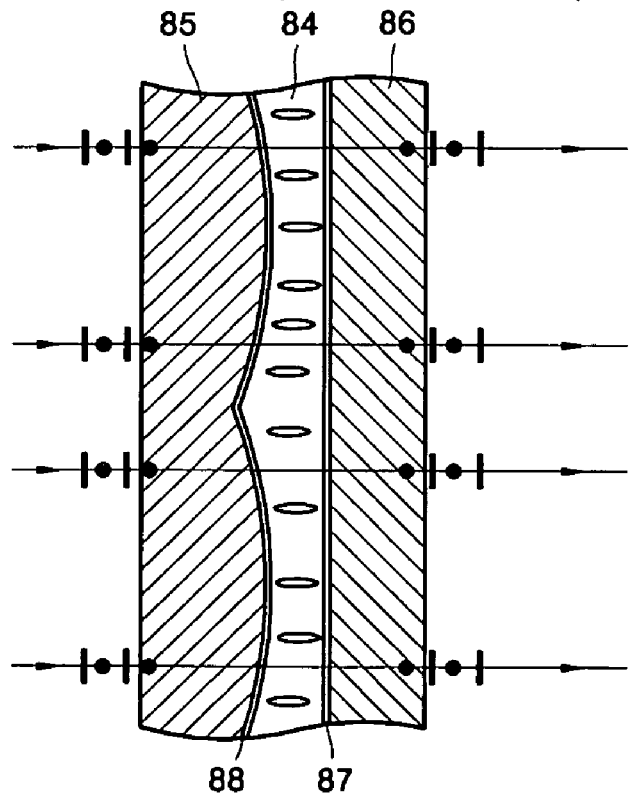
Figure 3:
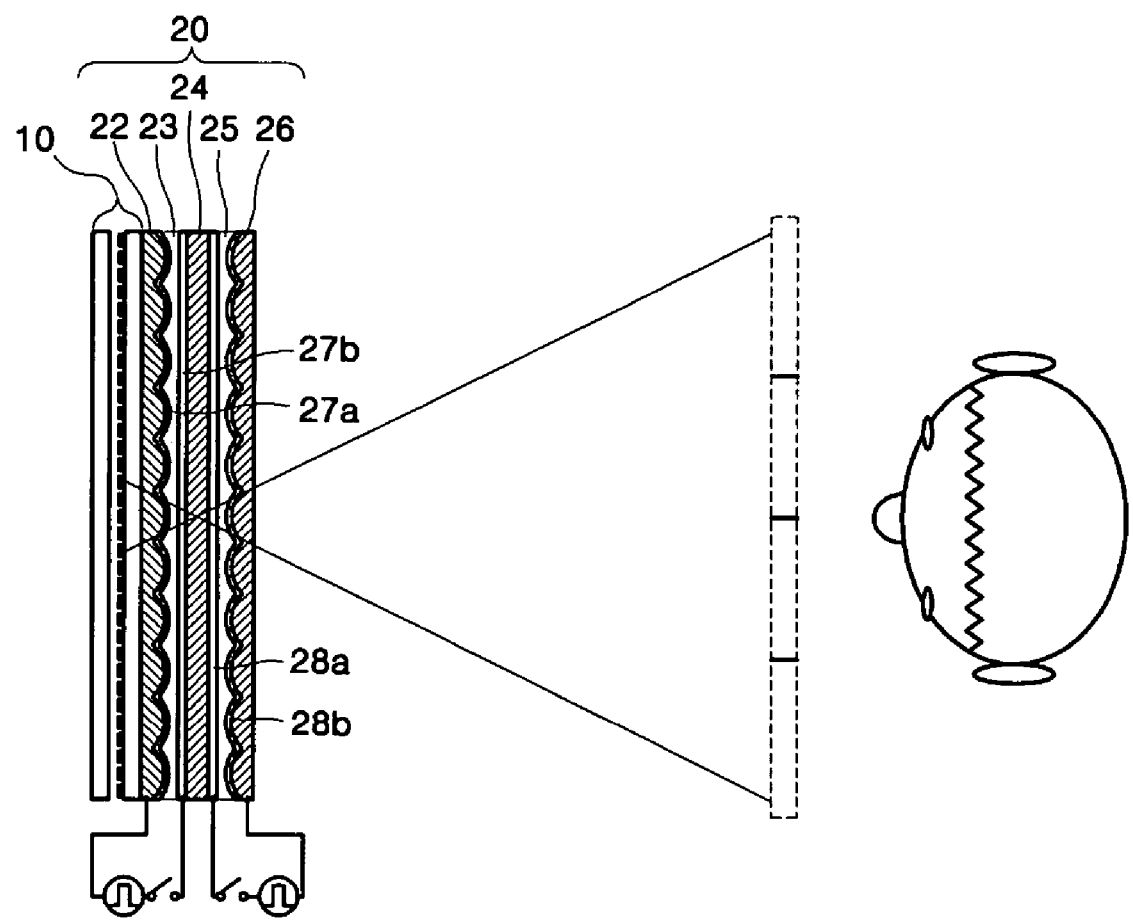
FIG. 3 schematically illustrates a 2D/3D switchable autostereoscopic display apparatus according to an exemplary embodiment of the present invention.

FIG. 3 schematically illustrates a 2D/3D switchable autostereoscopic display apparatus according to an exemplary embodiment of the present invention. Referring to FIG. 3, a 2D/3D switchable autostereoscopic display apparatus includes a display panel 10 providing an image and a lenticular means 20 transmitting the image provided by the display panel 10 as is in a 2D mode and separating the image into an image for a left eye and an image for a right eye in a 3D mode. The lenticular means 20 includes first and second lenticular lens sheets 22 and 26 facing each other, a half-wave plate 24 interposed between the first and second lenticular lens sheets 22 and 26, first and second electro-optical media 23 and 25 filling the space between the first lenticular lens sheet 22 and the half-wave plate 24 and the space between the second lenticular lens sheet 26 and the half-wave plate 24, respectively, and a plurality of transparent electrodes 27a, 27b, 28a, and 28b for applying electric fields to the first and second electro-optical media 23 and 25. Generally, in an electro-optical medium, the orientation of crystal varies according to a direction of an electric field applied, and a refractive index with respect to extraordinary rays varies. For example, liquid crystal, particularly, nematic liquid crystal, is usually used as the electro-optical medium.

Figure 4A:
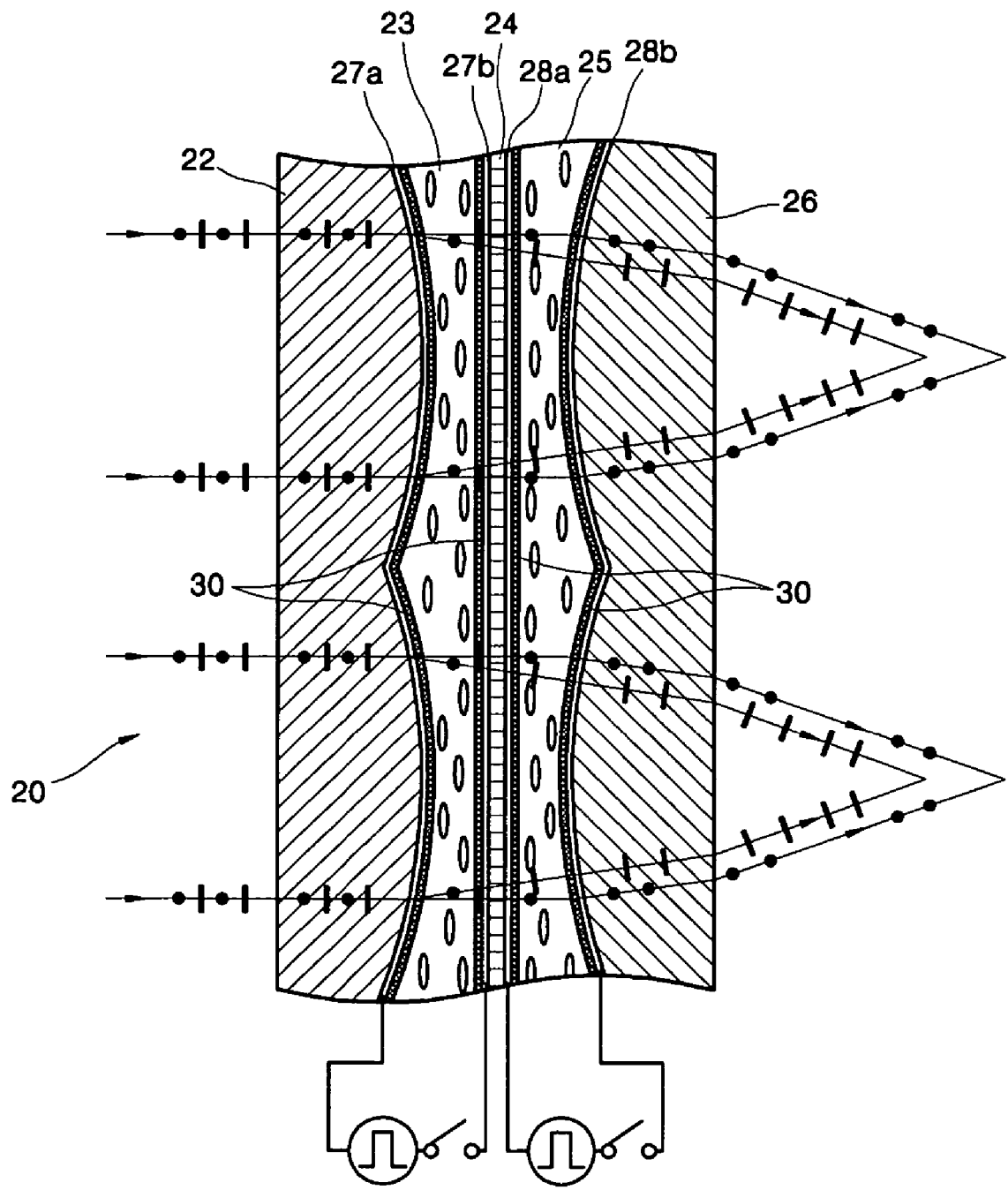
FIGS. 4A and 4B are cross-sectional views illustrating operation of a lenticular means in the 2D/3D switchable autostereoscopic display apparatus of FIG. 3.

FIG. 4A illustrates the lenticular means 20 in greater detail. As shown in FIG. 4A, the first and second lenticular lens sheets 22 and 26 have convex inner surfaces that face each other. The first transparent electrodes 27a and 27b for applying an electric field to the first electro-optical medium 23 are deposited on the inner surface of the first lenticular lens sheet 22 and on a surface of the half-wave plate 24 facing the first lenticular lens sheet 22, respectively. The first transparent electrodes 27a and 27b may be formed of indium tin oxide (ITO). Similarly, the second transparent electrodes 28a and 28b for applying an electric field to the second electro-optical medium 25 are deposited on the inner surface of the second lenticular lens sheet 26 and on the other surface of the half-wave plate 24 which faces the second lenticular lens sheet 26, respectively. The first and second electro-optical media 23 and 25 may be formed of nematic liquid crystal having a negative birefringence ($n_o > n_e$) in which a refractive index $n_o$ with respect to ordinary rays is greater than a refractive index $n_e$ with respect to extraordinary rays. The refractive index $n_o$ of the nematic liquid crystal should be equal to a refractive index $n_s$ of each of the first and second lenticular lens sheets 22 and 26 ($n_o=n_s$).

When no voltages are applied to the transparent electrodes 27a, 27b, 28a, and 28b, no electric fields are applied to the first and second electro-optical media 23 and 25. When no electric fields are applied to the first and second electro-optical media 23 and 25, as shown in FIG. 4A, the nematic liquid crystal of the first and second electro-optical media 23 and 25 is oriented parallel to the half-wave plate 24 and perpendicular to columns of the first and second lenticular lens sheets 22 and 26. Orientation layers 30 can be used to determine the orientation of nematic liquid crystal when no electric fields are applied to the nematic liquid crystal, as in the prior art. The orientation layers 30 are formed on the transparent electrodes 27a, 27b, 28a, and 28b and are manufactured by forming a plurality of very thin, parallel grooves on a material such as polyimide. The nematic liquid crystal is oriented parallel to the grooves. The use of the orientation layers 30 to orient liquid crystal in a specific direction is well known, and thus a detailed description thereof will be omitted.

Non-polarized light incident upon the lenticular means 20 is separated into two rays, namely, ordinary rays and extraordinary rays polarized perpendicular to each other. In FIG. 4A, rays having vertical lines thereon denote ordinary rays, and rays having dots thereon denote extraordinary rays. As shown in FIG. 4A, when no electric fields are applied, the first and second electro-optical media 23 and 25, for example, nematic liquid crystal, are oriented parallel to the polarization of the ordinary rays and perpendicular to the polarization of the extraordinary rays. In this case, the first lenticular lens sheet 22 and the first electro-optical medium 23 have the same refractive index with respect to the ordinary rays, and thus the convex surface of the first lenticular lens sheet 22 does not serve as a lens. Hence, the ordinary rays are incident upon the half-wave plate 24 without being refracted by the first lenticular lens sheet 22. On the other hand, the refractive index of the first lenticular lens sheet 22 with respect to the extraordinary rays is greater than that of the first electro-optical medium 23, and thus the extraordinary rays are focused by the first lenticular lens sheet 22 and are incident upon the half-wave plate 24.

The half-wave plate 24 rotates the polarization of incident light by 90°. Hence, the ordinary rays are transformed into extraordinary rays by the half-wave plate 24. Likewise, the extraordinary rays are transformed into ordinary rays by the half-wave plate 24. As a result, the ordinary rays incident upon the half-wave plate 24 without being refracted by the first lenticular lens sheet 22 are transformed into extraordinary rays by the half-wave plate 24 and are then focused upon passing through the second electro-optical medium 25 and the second lenticular lens sheet 26. On the other hand, the extraordinary rays refracted by the first lenticular lens sheet 22 are transformed into ordinary rays by the half-wave plate 24, and then the ordinary rays pass through the second electro-optical medium 25 and the second lenticular lens sheet 26 without further refraction. Hence, the ordinary and extraordinary rays of the non-polarized light incident upon the lenticular means 20 are both focused while passing through the first and second lenticular lens sheets 22 and 26.

In a conventional lenticular means, since only extraordinary rays are focused, only the extraordinary rays are refracted and produce an image for a left eye and an image for a right eye so that a viewer can see a different image in each eye. In other words, ordinary rays do not produce separate images which are respectively seen by the left and right eyes of the viewer. To prevent this problem, conventional stereoscopic display apparatuses including the conventional lenticular means only use display panels that generate polarized light, such as LCDs, or require additional polarization plates. However, the use of an additional polarization plate causes the brightness of a display apparatus to decrease by 50% or more. On the other hand, in an autostereoscopic display apparatus according to the present embodiment, since the lenticular means refracts all of the incident light rays, display panels that generate non-polarized light, such as, CRTs, PDPs, OLEDs, or FEDs, can also be used without a decrease in brightness. Although a focal point of rays focused by the first lenticular lens sheet 22 is different from that of rays focused by the second lenticular lens sheet 26 in FIG. 4A, the difference between the two focal points is 40 mm or less, which is small compared to the overall focal distance of about 400 mm. Hence, the small difference in focal points does not have a noticeable effect on the production of separate images for the two eyes of a viewer. Furthermore, the different focal points may be made to coincide with each other by adequately adjusting a voltage applied between the first transparent electrodes 27a and 27b and a voltage applied between the second transparent electrodes 28a and 28b.

Figure 4B:
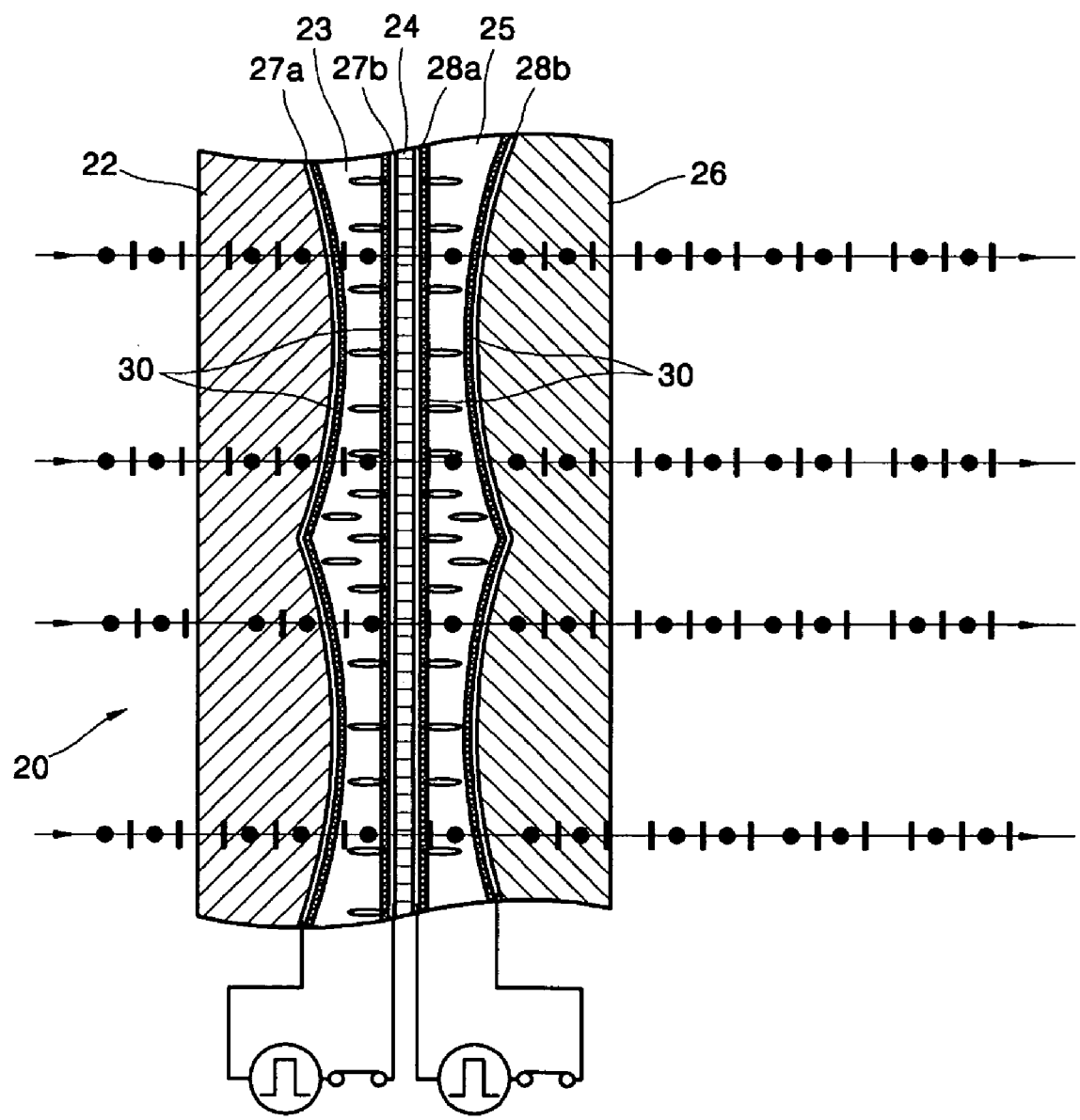

On the other hand, when voltages are applied to the transparent electrodes 27a, 27b, 28a, and 28b, electric fields are generated between the first transparent electrodes 27a and 27b and between the second transparent electrodes 28a and 28b. Then, while electric fields are being applied to the first and second electro-optical media 23 and 25, molecules of the first and second electro-optical media 23 and 25, such as, nematic liquid crystal, are arranged perpendicular to the lenticular lens sheets 22 and 26, as shown in FIG. 4B. In other words, the first and second electro-optical media 23 and 25 are oriented perpendicular to the directions in which the ordinary rays and the extraordinary rays are polarized when electric fields are applied. As a result, the birefringence of each of the first and second electro-optical media 23 and 25 is removed, and the refractive indices of the first and second electro-optical media 23 with respect to ordinary rays and extraordinary rays become equal to those of the first and second lenticular lens sheets 22 and 26. Hence, the convex surfaces of the first and second lenticular lens sheets 22 and 26 do not serve as lenses to refract the ordinary and extraordinary rays, and the ordinary and extraordinary rays are both transmitted by the lenticular means 20 without being refracted. In this case, the autostereoscopic display apparatus operates in a 2D mode.

Figure 5:
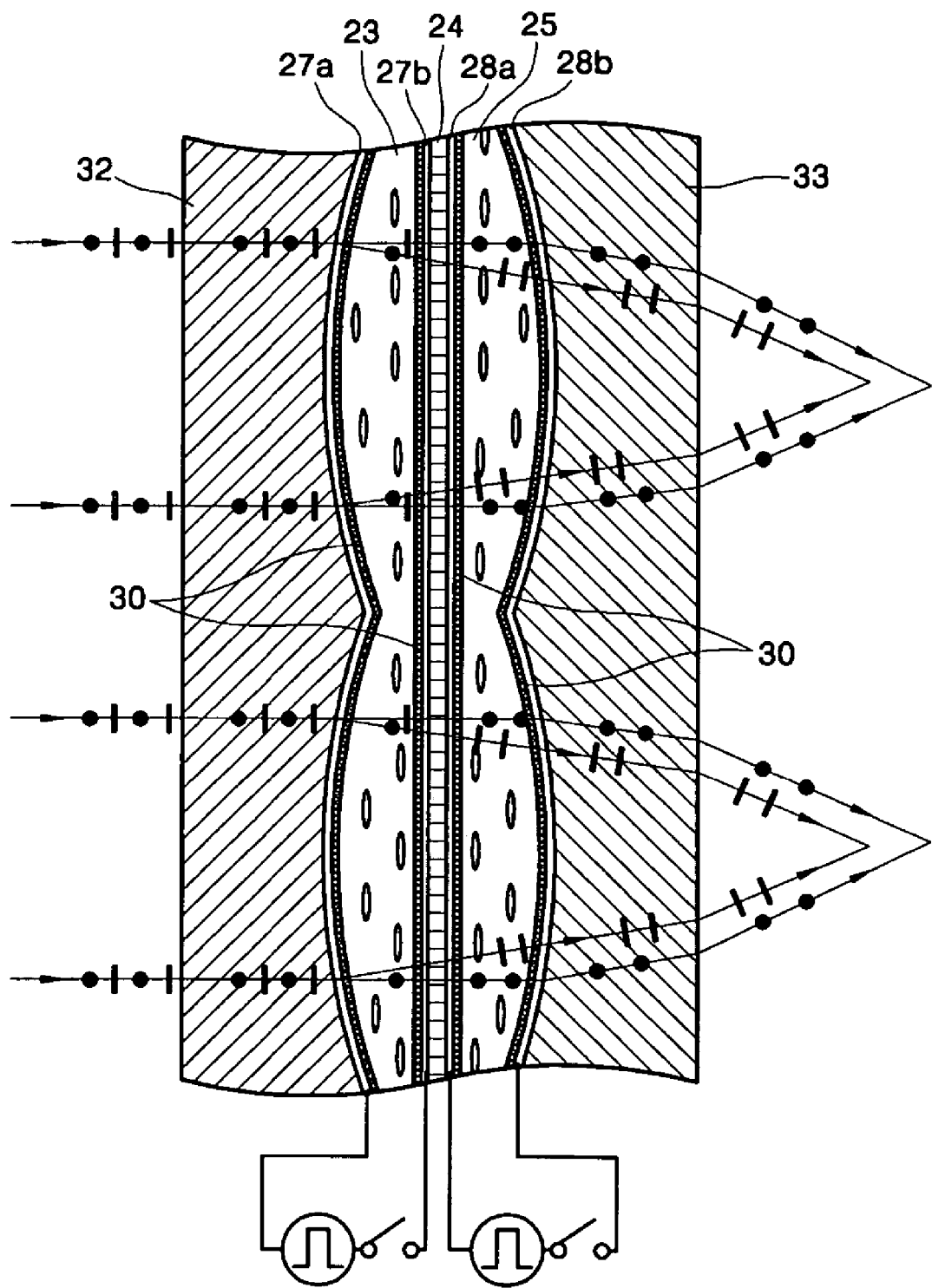
FIG. 5 is a cross-section of a lenticular means according to another exemplary embodiment of the present invention.

FIG. 5 is a cross-section of a lenticular means according to another exemplary embodiment of the present invention. In the lenticular means 20 shown in FIGS. 4A and 4B, the first and second electro-optical media 23 and 25 are formed of a material having a negative birefringence ($n_o>n_e$), in which the refractive index $n_o$ with respect to ordinary rays is greater than the refractive index $n_e$ with respect to extraordinary rays, and the refractive index $n_o$ is equal to the refractive index $n_s$ of each of the first and second lenticular lens sheets 22 and 26 ($n_o=n_s$). In the lenticular means shown in FIG. 5, the first and second electro-media 23 and 25 are formed of a material having a positive birefringence ($n_o<n_e$), in which the refractive index $n_o$ with respect to ordinary rays is smaller than the refractive index $n_e$ with respect to extraordinary rays, and the refractive index $n_o$ is equal to the refractive index $n_s$ of each of first and second lenticular lens sheets 32 and 33 ($n_o=n_s$). In the lenticular means of FIG. 5, the first and second lenticular lens sheets 32 and 33 have concave surfaces facing the first and second electro-optical media 23 and 25.

In this structure, when no electric fields are applied to the first and second electro-optical media 23 and 25, the refractive indices of the first and second electro-optical media 23 and 25 with respect to extraordinary rays become greater than those of the first and second lenticular lens sheets 32 and 33, and thus the first and second electro-optical media 23 and 25 serve as convex lenses for the extraordinary rays. Hence, extraordinary rays of the light incident upon the lenticular means of FIG. 5 are refracted by the first electro-optical medium 23, are transformed into ordinary rays while passing through the half-wave plate 24, and are then passed through the second electro-optical medium 25 without being refracted. On the other hand, ordinary rays of incident light are transmitted by the first electro-optical medium 23 without refraction, are transformed into extraordinary rays by the half-wave plate 24, and are then refracted by the second electro-optical medium 25. Consequently, the image provided by the display panel 10 is divided into an image for a left eye and an image for a right eye.

Figure 6A:
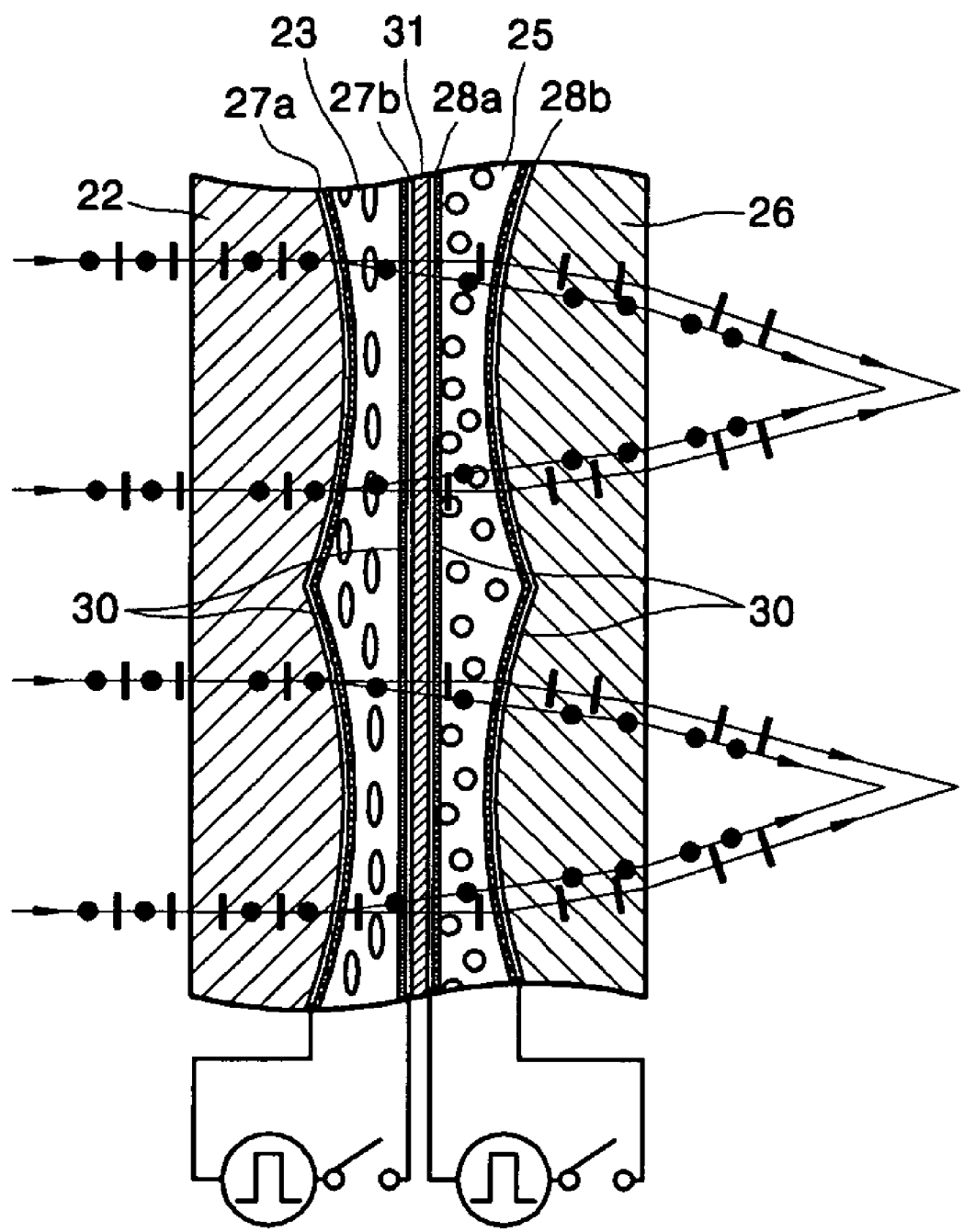
FIGS. 6A and 6B are cross-sections of a lenticular means according to another exemplary embodiment of the present invention.
Figure 6B:
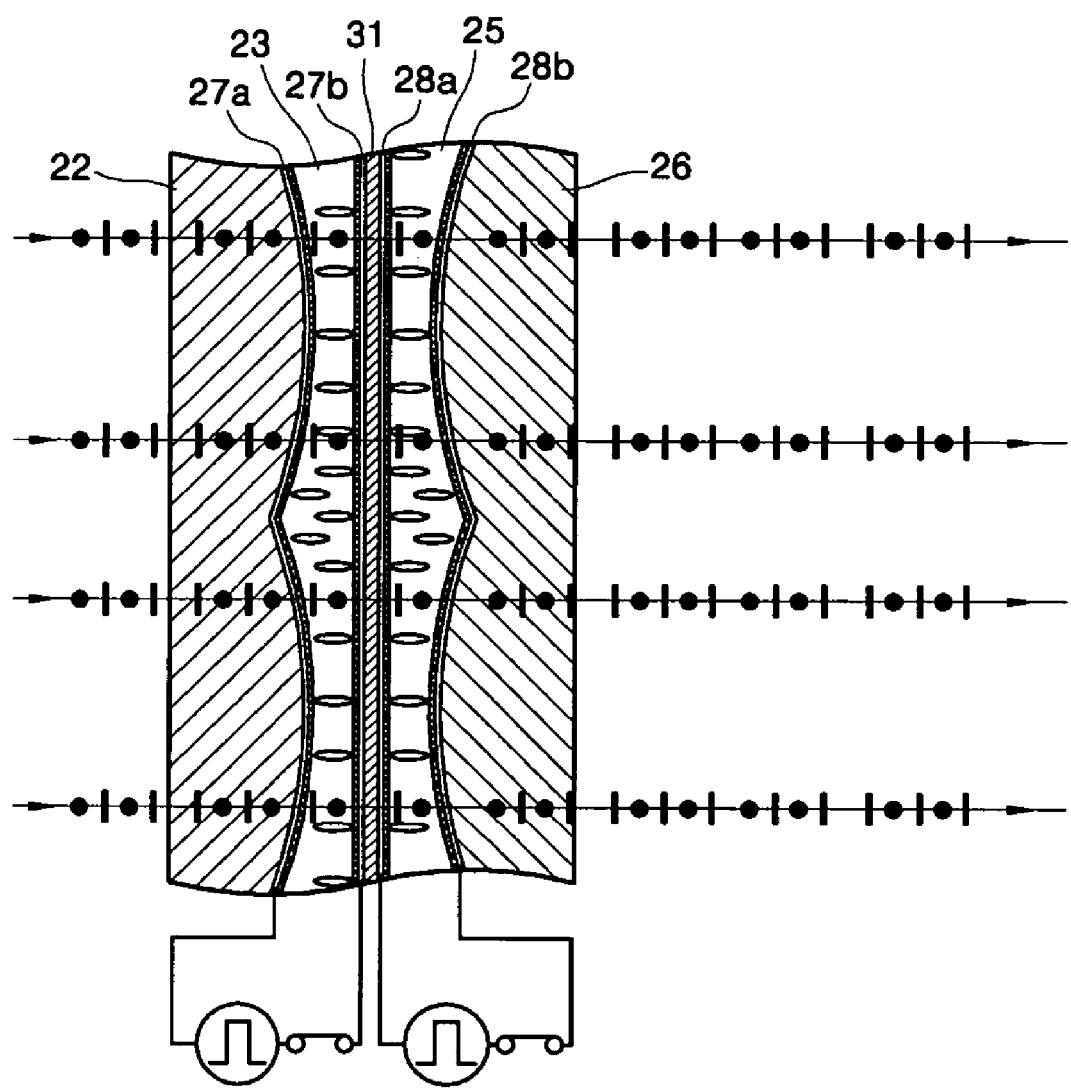

FIGS. 6A and 6B are cross-sections of a lenticular means according to another embodiment of the present invention. The lenticular means shown in FIGS. 6A and 6B includes a transparent, flat-surfaced plate 31 instead of the half-wave plate 24. When no electric fields are applied, the first and second electro-optic media 23 and 25 are oriented perpendicular to each other. More specifically, as shown in FIG. 6A, when no electric fields are applied, molecules of the first electro-optical medium 23 are oriented parallel to the plane of the drawing and the flat-surfaced plate 31, while molecules of the second electro-optical medium 25 are oriented perpendicular to the plane of the drawing and parallel to the flat-surfaced plate 31.

Based on the mechanism described above, in this structure, the extraordinary rays of the incident light are refracted by the convex surface of the first lenticular lens sheet 22, are passed through the transparent, flat-surfaced plate 31, and are then incident upon the second electro-optical medium 25. Since the second electro-optical medium 25 is oriented perpendicular to the first electro-optical medium 23, the extraordinary rays pass through the second lenticular lens sheet 26 without being refracted further. Since the second electro-optical medium 25 is oriented perpendicular to the first electro-optical medium 23, the ordinary rays are refracted by the second lenticular lens sheet 26. As a result, the extraordinary are refracted by the first lenticular lens sheet 23, and the ordinary rays are refracted by the second lenticular lens sheet 26. Accordingly, in the 3D of FIG. 6A, all of the incident light is refracted to produce an image for a left eye and an image for a right eye so that a viewer can perceive a stereoscopic image.

On the other hand, when voltages are applied to the transparent electrodes 27a, 27b, 28a, and 28b, electric fields are generated within the first and second electro-optical media 23 and 25. Then, the molecules of the first and second electro-optical media 23 and 25 are respectively rotated so as to be arranged perpendicular to the flat-surfaced plate 31, as shown in FIG. 6B. Referring to FIG. 6B, as in the previous embodiments, the extraordinary and ordinary rays pass through the first and second lenticular lens sheets 22 and 26 without being refracted, and thus the autostereoscopic image display apparatus operates in the 2D mode.

Figure 7:
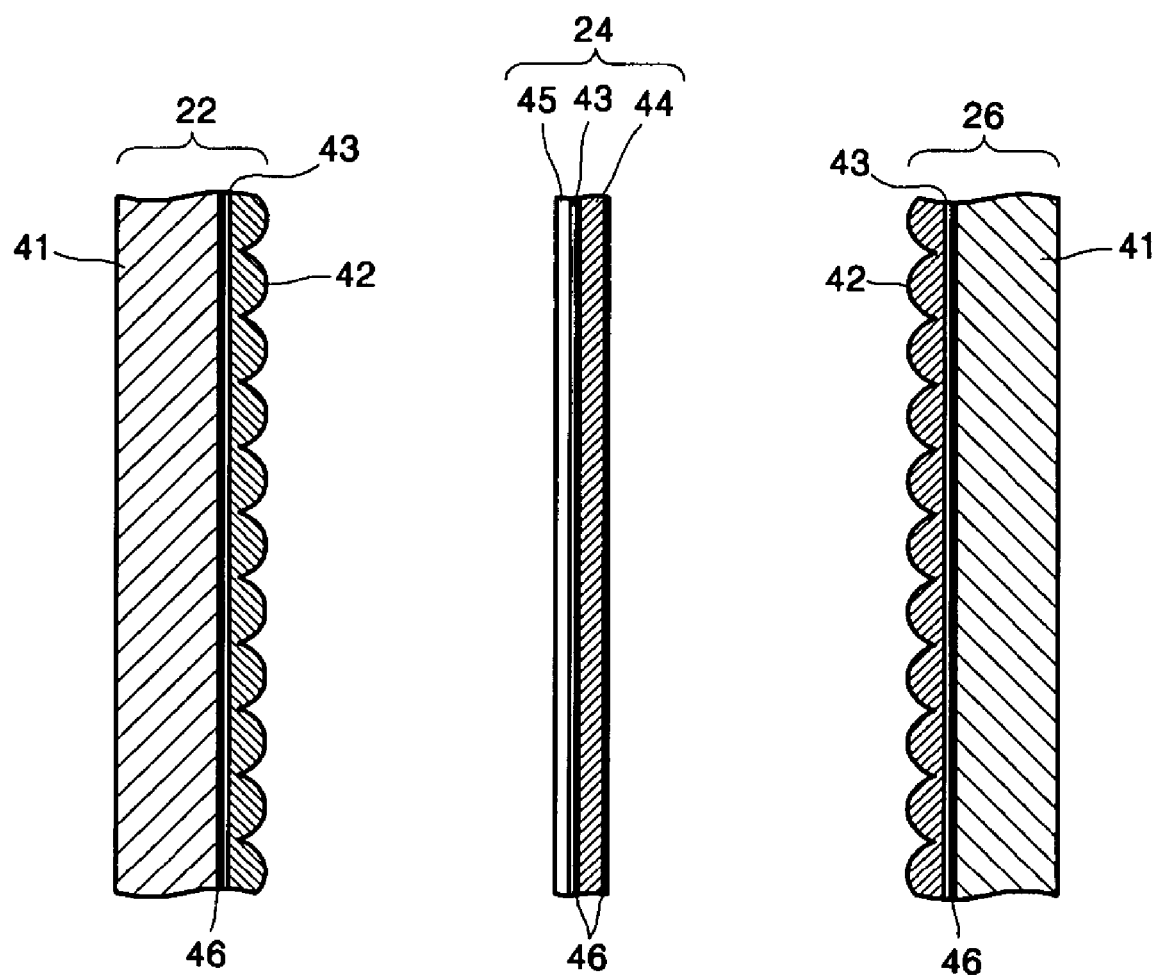
FIG. 7 is a cross-section of a lenticular means according to another exemplary embodiment of the present invention.

As shown in FIGS. 3 through 6B, each of the lenticular lens sheets 22 and 26 (32 and 33) is formed as a single body. To reduce manufacturing costs, as shown in FIG. 7, each of the lenticular lens sheets 22 and 26 (32 and 33) may be manufactured as two layers, namely, a transparent, flat-surfaced plate 41 and a lenticular layer 42, which are adhered to each other using a transparent adhesive 43. As shown in FIG. 7, the half-wave plate 24 may be manufactured by attaching a birefringent polymer film 45 onto an isotropic, transparent plate 44, such as glass, using the transparent adhesive 43. To apply uniform electric fields to the first and second electro-optical media 23 and 25, a flat, transparent electrode 46 may be formed between the transparent, flat-surfaced plate 41 and the lenticular layer 42, rather then forming transparent electrodes on the convex or concave lens sides of the lenticular lens sheets 22 and 26. The flat, transparent electrodes 46 may be deposited between the isotropic, transparent plate 44 of the half-wave plate 24 and the birefringent polymer film 45.

Figure 8:
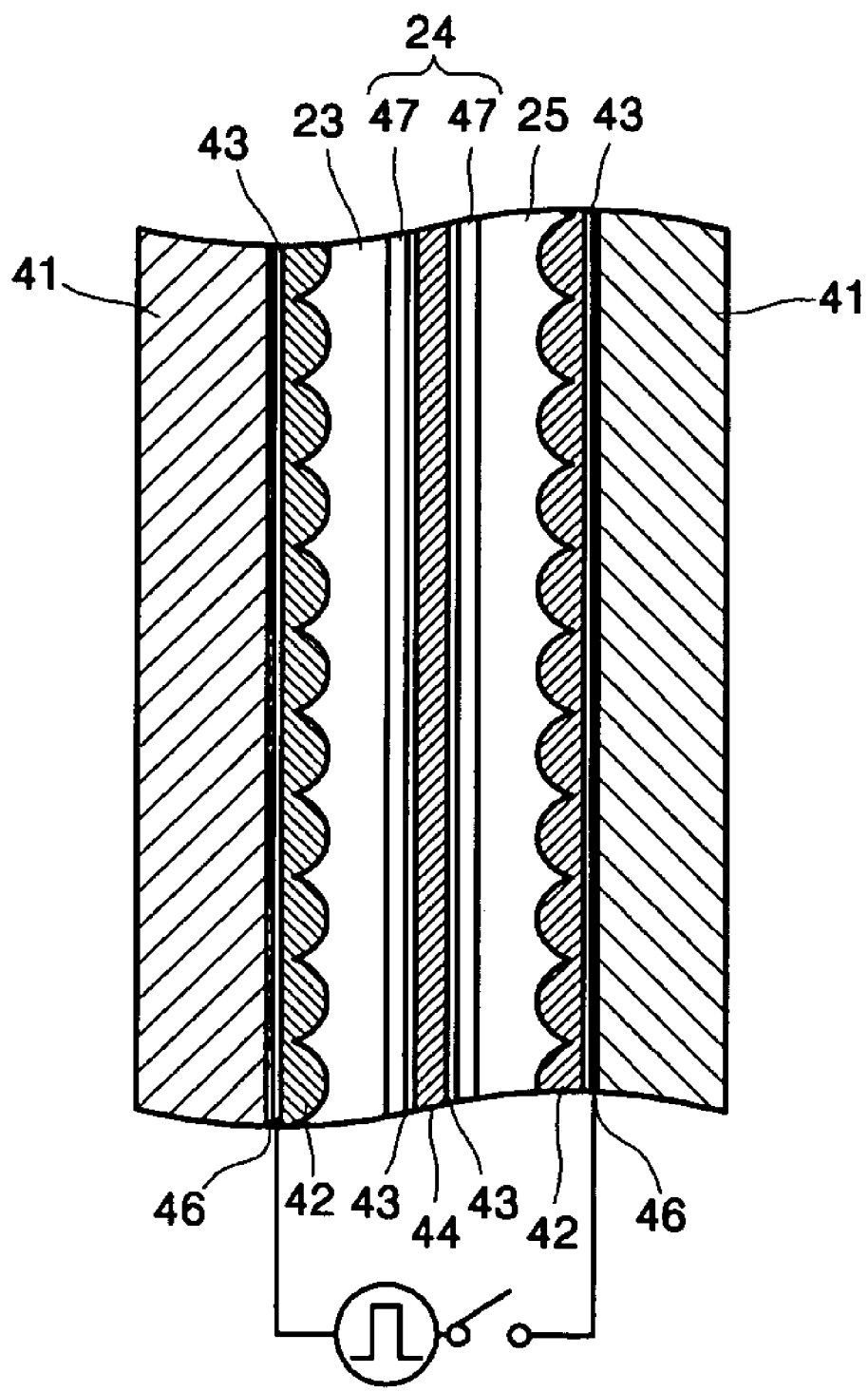
FIG. 8 is a cross-section of a lenticular means according to another exemplary embodiment of the present invention.

To form a symmetrical lenticular means, as shown in FIG. 8, the half-wave plate 24 may be manufactured by attaching a quarter-wave plate 47 to either side of the transparent plate 44.

In the lenticular means of FIGS. 3 through 6B, an electric field is applied to the first electro-optical medium 23 by the first transparent electrodes 27a and 27b, and an electric field is applied to the second electro-optical medium 25 by the second transparent electrodes 28a and 28b. However, in the lenticular means of FIG. 8, an electric field is applied to each of the first and second electro-optical media 23 and 25 by the transparent electrode 46 formed in each of the first and second lenticular lens sheets 22 and 26. In this case, only one driving source is needed, and no transparent electrodes are attached to the half-wave plate 24, thereby minimizing optical loss.

Figure 9A:
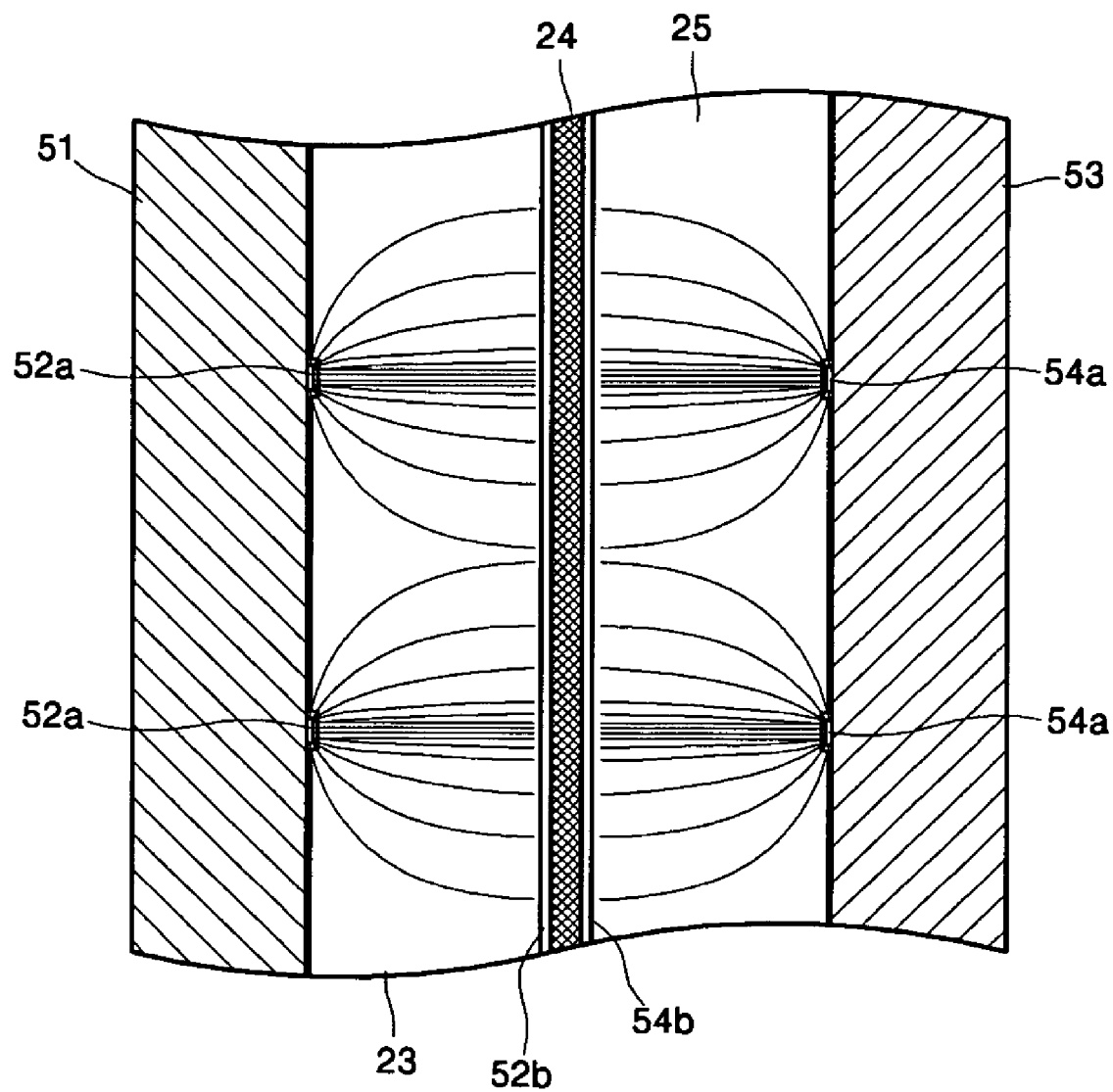
FIG. 9A is a cross-section of a lenticular means according to another exemplary embodiment of the present invention.

FIG. 9A is a cross-section of a lenticular means according to another exemplary embodiment of the present invention. Referring to FIG. 9A, the lenticular means includes first and second flat-surfaced plates 51 and 53, disposed parallel to each other and facing each other; a half-wave plate 24 parallel to the first and second flat-surfaced plates 51 and 53 and interposed therebetween; first and second electro-optical media 23 and 25, with which the space between the first flat-surfaced plate 51 and the half-wave plate 24 and the space between the second flat-surfaced plate 53 and the half-wave plate 24 are respectively filled; and electrodes 52a, 52b, 54a, and 54b which form an electric field gradient having a symmetrical distribution within each of the first and second electro-optical media 23 and 25 so that extraordinary rays can be focused by the first and second electro-optical media 23 and 25.

In the lenticular means shown in FIGS. 3 through 8, a lens side of a lenticular lens sheet selectively executes its function according to a change in the refractive index of an electro-optical medium. On the other hand, the lenticular means shown in FIG. 9A uses the principle that the refractive index of an electro-optical medium varies according to the flux of an electric field within the electro-optical medium, such as, nematic liquid crystal. In other words, when the flux of the electric field within the electro-optical medium has a gradient due to the shape of an electrode structure, the refractive index of the electro-optical medium varies, and the electro-optical medium serves as a lens. Thus, the lenticular means of FIG. 9A includes the flat, transparent plates 51 and 53 instead of lenticular lens sheets having lens surfaces.

Figure 9B:
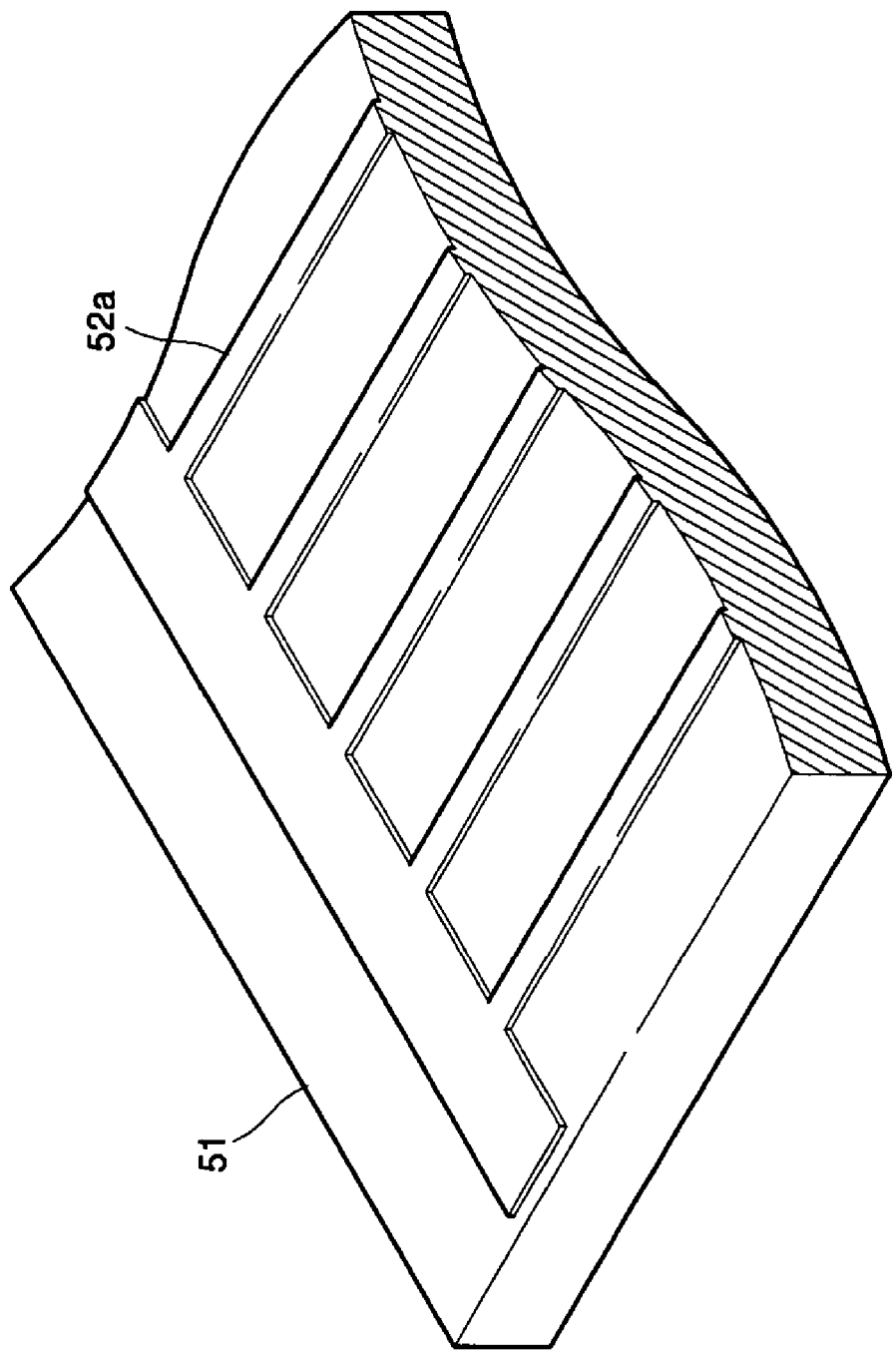
FIG. 9B is a perspective view of strip-shaped electrodes formed on a transparent plate of the lenticular means of FIG. 9A.

As shown in FIG. 9A, the electrode structure includes electrodes 52b and 54b, which are planar and transparent, completely extending over both sides of the half-wave plate 24, and electrodes 52a and 54a, each of which is a configuration of a plurality of strips and is transparent, formed in parallel on inner sides of the first and second flat-surfaced plates 51 and 53, respectively. FIG. 9B is a perspective view of the strip-shaped transparent electrodes 52a formed on the first flat-surfaced plate 51. As shown in FIG. 9B, the strip-shaped transparent electrodes 52a extend vertically and in parallel on the flat-surfaced plate 51.

In this structure, when voltages are applied between the planar transparent electrode 52b and the strip-shaped transparent electrodes 52a and between the planar transparent electrode 54b and the strip-shaped transparent electrodes 54a, electric fields are formed within the first and second electro-optical media 23 and 25 as shown in FIG. 9A. The electric fields shown in FIG. 9A are generated when the dielectric constants of the first and second electro-optical media 23 and 25 are equal to those of the first and second flat-surfaced plates 51 and 53. The density of electric field lines denotes the intensity of the electric field. In other words, the higher the density of electric field lines, the greater the intensity of the electric field. As shown in FIG. 9A, the intensities of the electric fields are the highest at the centers of the strip-shaped transparent electrodes 52a and 54a and gradually decrease toward the peripheries thereof. The electric fields are each symmetrical with respect to the centers of the strip-shaped transparent electrodes 52a and 54a. Generally, the refractive index of an electro-optical medium with respect to extraordinary rays varies according to the intensity of an electric field formed in the electro-optical medium. For example, as the intensity of the electric field increases, the refractive index of the electro-optical medium with respect to extraordinary rays increases. Thus, the refractive index of each of the first and second electro-optical media 23 and 25 with respect to extraordinary rays results in a symmetrical gradient having a line shape shown in FIG. 9A. As a result, the first and second electro-optical media 23 and 25 serve as convex lenses for focusing extraordinary rays.

Accordingly, when voltages are applied between the planar transparent electrode 52b and the strip-shaped transparent electrodes 52a and between the planar transparent electrode 54b and the strip-shaped transparent electrodes 54a, ordinary rays of light incident upon the lenticular lens of FIGS. 9A and 9B pass through the first electro-optical medium 23 without refraction, are transformed into extraordinary rays by the half-wave plate 24, and then are focused by the second electro-optical medium 25. Extraordinary rays of incident light are focused by the first electro-optical medium 23, are transformed into ordinary rays by the half-wave plate 24, and then are passed through the second electro-optical medium 25 without being refracted. On the other hand, when no voltage is applied to between the planar transparent electrode 52b and the strip-shaped transparent electrodes 52a or between the planar transparent electrode 54b and the strip-shaped transparent electrodes 54a, the extraordinary rays and the ordinary rays pass through the lenticular means without being refracted because the flat-surfaced plates 51 and 53 are flat.

Figure 10:
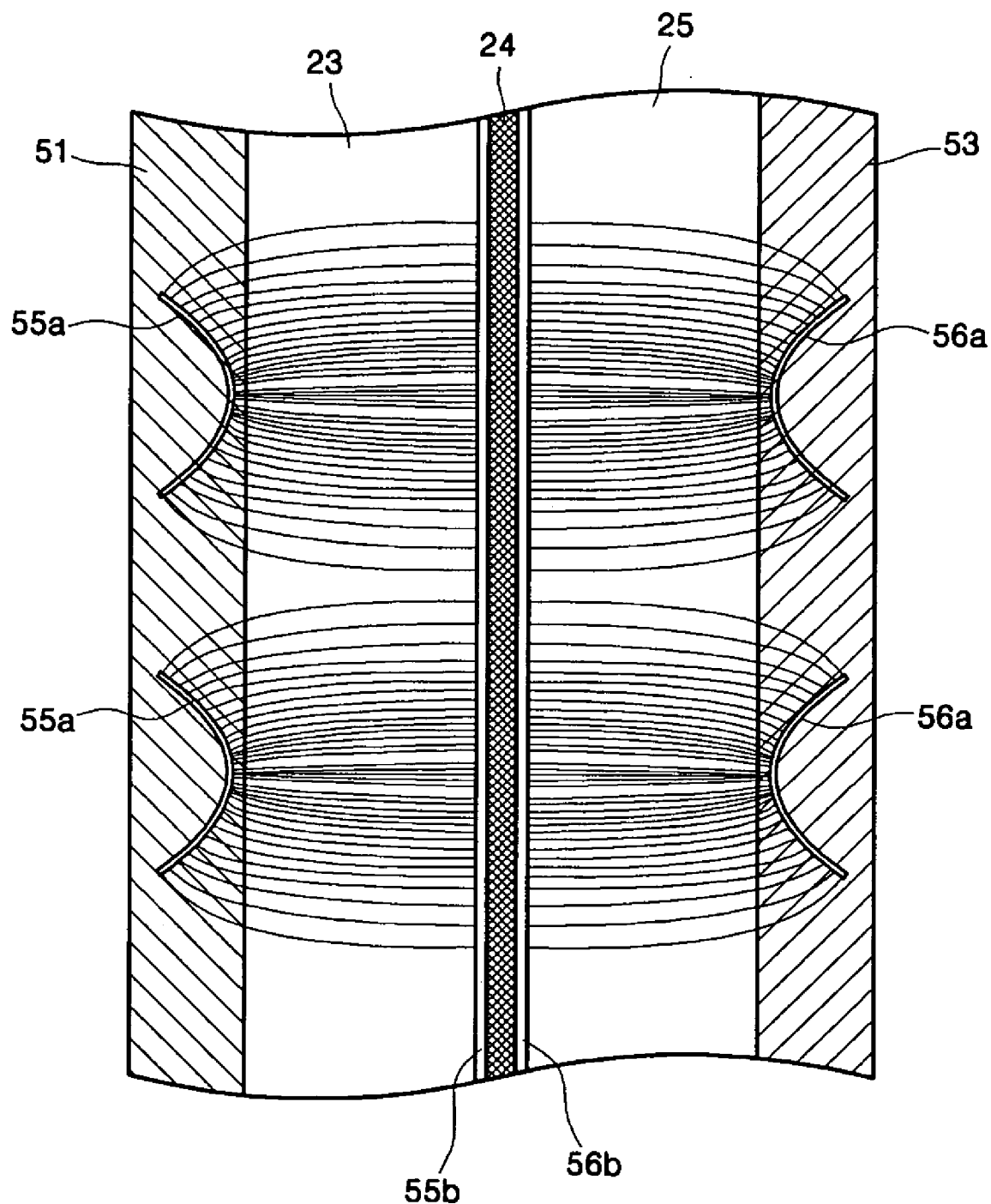
FIG. 10 is a cross-section of a lenticular means according to another exemplary embodiment of the present invention.

FIG. 10 is a cross-section of a lenticular means according to another exemplary embodiment of the present invention. The lenticular means of FIG. 10 has the same structure as the lenticular means of FIGS. 9A and 9B except that the electrode structure of FIG. 10 has better focusing characteristics. As shown in FIG. 10, the electrode structure includes planar transparent electrodes 55b and 56b, completely extending over both sides of the half-wave plate 24, and a plurality of curved transparent electrodes 55a and 56a inserted into the first and second flat-surfaced plates 51 and 53, respectively, to be parallel to one another. In other words, the lenticular means of FIG. 10 includes arched transparent electrodes 55a and 56a inserted into the flat-surfaced plates 51 and 53 instead of the strip-shaped transparent electrodes 52a and 54a being deposited on the flat-surfaced plates 51 and 53. Gradient distributions of electric fields formed within the first and second electro-optical media 23 and 25 may be adjusted by adjusting the shapes of the curved transparent electrodes 55a and 56a.

Figure 11A:
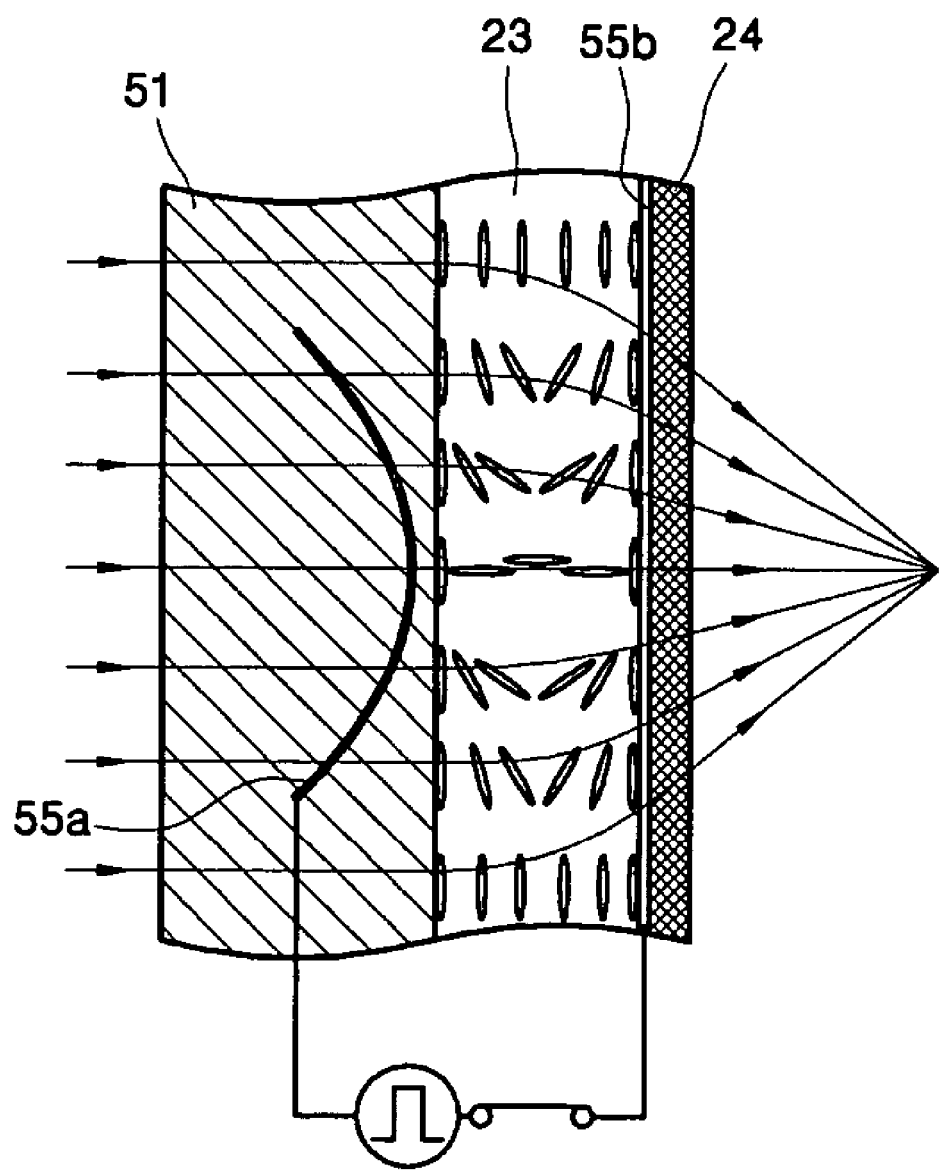
FIGS. 11A and 11B are cross-sections illustrating operations of the lenticular means of FIG. 10.
Figure 11B:
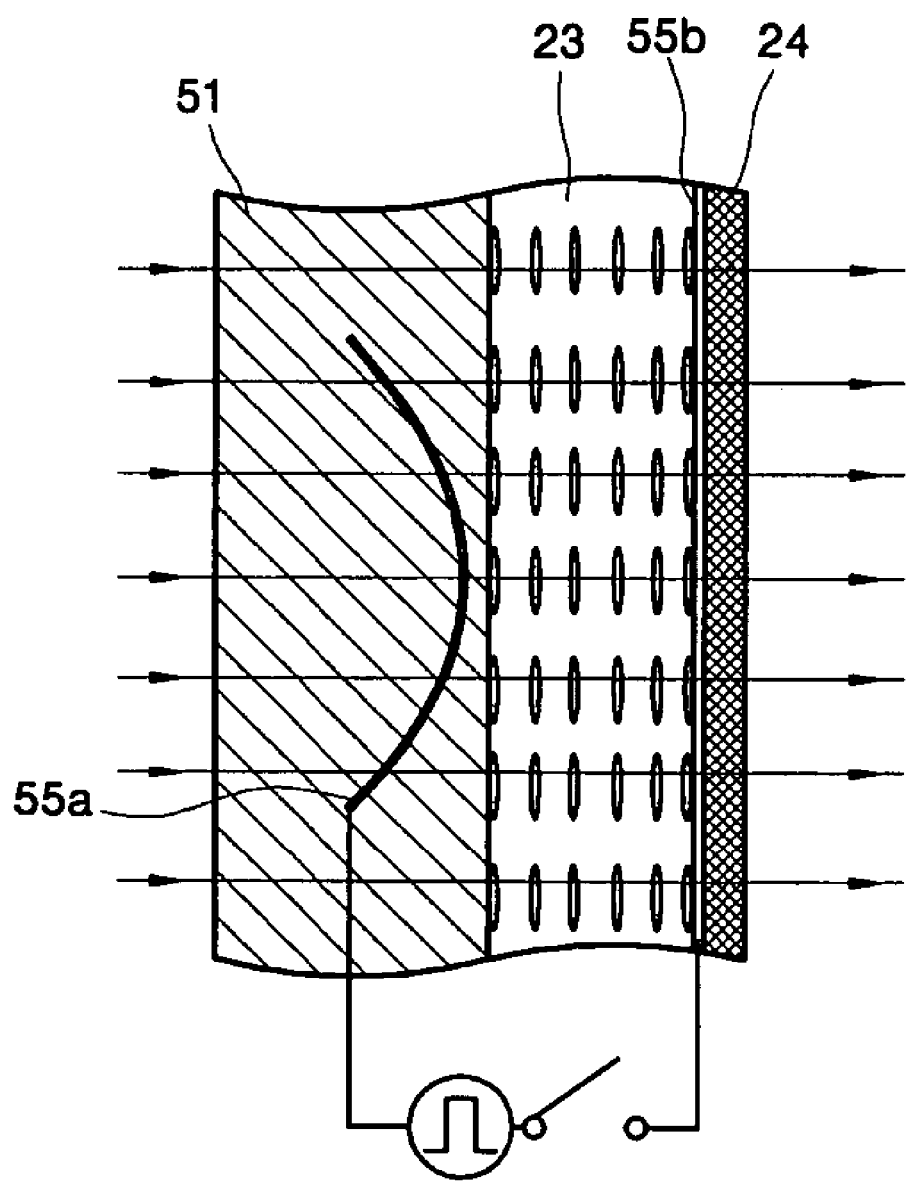

FIGS. 11A and 11B are cross-sections illustrating operations of the lenticular means of FIG. 10. For simplicity, second flat-surfaced plate 53 and the second electro-optical medium 25 are not shown in FIGS. 11A and 11B.

In a 3D mode, when a voltage is applied to the curved transparent electrode 55a and the planar transparent electrode 55b, an electric field is formed between the two electrodes 55a and 55b, and the molecules of the first electro-optical medium 23 are arranged as shown in FIG. 11A. Then, the ordinary rays of the light incident upon the lenticular lens of FIG. 10 pass through the first electro-optical medium 23 without refraction and are then transformed into extraordinary rays by the half-wave plate 24. Thereafter, although not shown, the extraordinary rays are focused by the second electro-optical medium 25. The extraordinary rays of the incident light are focused by the first electro-optical medium 23 and transformed into ordinary rays by the half-wave plate 24. Thereafter, although not shown, the ordinary rays pass through the second electro-optical medium 25 without being refracted.

In a 2D mode, when no voltage is applied between the planar transparent electrode 55b and the curved transparent electrodes 55a, the molecules of the first electro-optical medium 23 are oriented parallel to the flat-surfaced plate 51 as shown in FIG. 11B. In this case, the extraordinary rays and the ordinary rays pass through the lenticular means without being refracted, because the refractive index is constant within the first electro-optical medium 23 and the flat-surfaced plate 51 and the electro-optical medium 23 are flat.

As described above, the 2D/3D switchable autostereoscopic display apparatuses according to the exemplary embodiments of the present invention can use a display panel that emits non-polarized light as well as a display panel that emits polarized light. In addition, the brightnesses of the 2D/3D switchable autostereoscopic display apparatuses are not reduced.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A two-dimensional/three-dimensional (2D/3D) switchable autostereoscopic display apparatus comprising:
   a display panel which provides an image; and
   a lenticular unit comprising:
      a first lenticular lens sheet and a second lenticular lens sheet disposed so that lens sides of the first and second lenticular lens sheets face each other;
      a half-wave plate, interposed between the first and second lenticular lens sheets, which rotates the polarization of an incident light beam by 90 degrees;
      a first electro-optical medium and a second electro-optical medium disposed in a space between the first lenticular lens sheet and the half-wave plate and a space between the second lenticular lens sheet and the half-wave plate, respectively, wherein the first and second electro-optical media have refractive indices with respect to extraordinary rays that vary according to whether or not electric fields are applied to the first and second electro-optical media; and
      transparent electrodes which apply electric fields to the first and second electro-optical media;
   wherein the lenticular unit has a two-dimensional mode and a three-dimensional mode, and in the two-dimensional mode, the lenticular unit transmits the image from the display panel as a single image, and in the three-dimensional mode, the lenticular unit separates the image from the display panel into a right-eye image and a left-eye image;

wherein a non-zero-electrical field is applied for achieving the two-dimensional mode; and wherein a zero electrical field is applied for achieving the three-dimensional mode.

2. The 2D/3D switchable autostereoscopic display apparatus of claim 1, wherein the refractive indices of the first and second electro-optical media with respect to ordinary rays are substantially the same as the refractive indices of the first and second lenticular lens sheets.

3. The 2D/3D switchable autostereoscopic display apparatus of claim 2, wherein:

when no electric fields are applied to the first and second electro-optical media, the refractive indices of the first and second electro-optical media with respect to extraordinary rays are lower than the refractive indices of the first and second electro-optical media with respect to ordinary rays; and when electric fields are applied to the first and second electro-optical media, the refractive indices of the first and second electro-optical media with respect to extraordinary rays are equal to the refractive indices of the first and second electro-optical media with respect to ordinary rays.

4. The 2D/3D switchable autostereoscopic display apparatus of claim 3, wherein the lens sides of the first and second lenticular lens sheets are convex.

5. The 2D/3D switchable autostereoscopic display apparatus of claim 2, wherein:

when no electric fields are applied to the first and second electro-optical media, the refractive indices of the first and second electro-optical media with respect to extraordinary rays are higher than the refractive indices of the first and second electro-optical media with respect to ordinary rays; and when electric fields are applied to the first and second electro-optical media, the refractive indices of the first and second electro-optical media with respect to extraordinary rays are equal to the refractive indices of the first and second electro-optical media with respect to ordinary rays.

6. The 2D/3D switchable autostereoscopic display apparatus of claim 5, wherein the lens sides of the first and second lenticular lens sheets are concave.

7. The 2D/3D switchable autostereoscopic display apparatus of claim 1, wherein the transparent electrodes comprise:

first transparent electrodes formed on the lens side of the first lenticular lens sheet and on a first side of the half-wave plate, which apply an electric field to the first electro-optical medium; and second transparent electrodes formed on the lens side of the second lenticular lens sheet and on a second side of the half-wave plate, which apply an electric field to the second electro-optical medium.

8. The 2D/3D switchable autostereoscopic display apparatus of claim 1, wherein each of the first and second lenticular lens sheets each comprise:

a transparent plate; and a lenticular layer attached to the transparent plate.

9. The 2D/3D switchable autostereoscopic display apparatus of claim 8, wherein the transparent electrodes are interposed between the transparent plate and the lenticular layer of the first lenticular lens sheet and between the transparent plate and the lenticular layer of the second lenticular lens sheet so that electric fields are simultaneously applied to the first and second electro-optical media.

10. The 2D/3D switchable autostereoscopic display apparatus of claim 1, wherein the first and second electro-optical media comprise nematic liquid crystal.

11. The 2D/3D switchable autostereoscopic display apparatus of claim 10, wherein:

when no electric fields are applied to the nematic liquid crystal, the nematic liquid crystal is oriented parallel to the polarization of ordinary rays and perpendicular to the polarization of extraordinary rays; and when electric fields are applied to the nematic liquid crystal, the nematic liquid crystal is oriented perpendicular to the polarizations of both the extraordinary and ordinary rays.

12. The 2D/3D switchable autostereoscopic display apparatus of claim 1, wherein the display panel is a panel selected from the group consisting of: a liquid crystal display, a plasma display panel, an organic light emitting device, a field emission device, and a cathode ray tube.

13. A 2D/3D switchable autostereoscopic display apparatus comprising:

a display panel which provides an image; and a lenticular unit comprising:

a first lenticular lens sheet and a second lenticular lens sheet disposed so that lens sides of the first and second lenticular lens sheets face each other;

a transparent plate interposed between the first and second lenticular lens sheets;

a first electro-optical medium and a second electro-optical medium disposed in a space between the first lenticular lens sheet and the transparent plate and a space between the second lenticular lens sheet and the transparent plate, respectively; and transparent electrodes which apply electric fields to the first and second electro-optical media, wherein:

the lenticular unit has a two-dimensional mode and a three-dimensional mode, and in the two-dimensional mode, the lenticular unit transmits the image from the display panel as a single image, and in the three-dimensional mode, the lenticular unit separates the image from the display panel into a right-eye image and a left-eye image;

when no electric fields are applied to the first and second electro-optical media, molecules within the first electro-optical medium are oriented parallel to the polarization of ordinary rays and perpendicular to the polarization of extraordinary rays, and molecules within the second electro-optical medium are oriented perpendicular to the polarization direction of the ordinary rays and parallel to the polarization of the extraordinary rays; and when electric fields are applied to the first and second electro-optical media, the first and second electro-optical media are oriented perpendicular to both the polarizations of the extraordinary and ordinary rays;

wherein a non-zero-electrical field is applied for achieving the two-dimensional mode; and wherein a zero electrical field is applied for achieving the three-dimensional mode.

14. The 2D/3D switchable autostereoscopic display apparatus of claim 13, wherein in the three-dimensional mode, when no voltage is applied to the transparent electrodes, ordinary rays of incident light pass through the first lenticular lens sheet without refraction and are then refracted by the second lenticular lens sheet, and extraordinary rays of the incident light are refracted by the first lenticular lens sheet and then pass through the second lenticular lens sheet without being refracted.

15. The 2D/3D switchable autostereoscopic display apparatus of claim 14, wherein the transparent electrodes are formed on lens sides of the first and second lenticular lens sheets and on both sides of the transparent plate.

16. A 2D/3D switchable autostereoscopic display apparatus comprising:
a display panel which provides an image; and
a lenticular unit comprising:
a first flat-surfaced plate and a second flat-surfaced plate disposed in parallel an facing each other;
a half-wave plate interposed between the first and second flat-surfaced plates, which rotates a polarization of an incident light beam by 90 degrees;
a first electro-optical medium and a second electro-optical medium disposed in a space between the first flat-surfaced plate and the half-wave plate and a space between the second flat-surfaced plate and the half-wave plate, respectively, wherein the first and second electro-optical media have refractive indices with respect to extraordinary rays that vary according to intensities of electric fields applied to the first and second electro-optical media; and
an electrode structure which forms an electric field gradient having a symmetrical distribution within each of the first and second electro-optical media so that extraordinary rays of the light incident upon the lenticular unit are focused by the first and second electro-optical media;
wherein the lenticular unit has a two-dimensional mode and a three-dimensional mode, and in the two-dimensional mode, the lenticular unit transmits the image from the display panel as a single image, and in the three-dimensional mode, the lenticular unit separates the image from the display panel into a right-eye image and a left-eye image;
wherein a zero-electrical field is applied for achieving the two-dimensional mode; and
wherein a non-zero electrical field is applied for achieving the three-dimensional mode.

17. The 2D/3D switchable autostereoscopic display apparatus of claim 16, wherein the electrode structure comprises:
a plurality of planar transparent electrodes disposed over both sides of the half-wave plate; and
a plurality of strip-shaped transparent electrodes arranged in parallel on an inner surface of each of the first and second flat-surfaced plates.

18. The 2D/3D switchable autostereoscopic display apparatus of claim 16, wherein the electrode structure comprises:
a plurality of planar transparent electrodes disposed over both sides of the half-wave plate; and
a plurality of curved transparent electrodes disposed in parallel in each of the first and second flat-surfaced plates.

19. The 2D/3D switchable autostereoscopic display apparatus of claim 16, wherein the refractive indices of the first and second electro-optical media with respect to the extraordinary rays are symmetrically distributed due to electric field gradients formed within the first and second electro-optical media.

20. The 2D/3D switchable autostereoscopic display apparatus of claim 19, wherein, when no voltage is applied to the electrode structure, all of the incident light is transmitted by the first and second electro-optical media without being refracted.

21. The 2D/3D switchable autostereoscopic display apparatus of claim 16, wherein the first and second electro-optical media comprise nematic liquid crystal.

22. The 2D/3D switchable autostereoscopic display apparatus of claim 16, wherein the display panel is a panel selected from the group consisting of a liquid crystal display, a plasma display panel, an organic light emitting device, a field emission device, and a cathode ray tube.

23. A display apparatus comprising:
a display panel which provides an image; and
a lenticular unit which transmits the image provided by the display panel, wherein the lenticular unit comprises:
a first lenticular lens sheet and a second lenticular lens sheet disposed so that lens sides of the first and second lenticular lens sheets face each other;
a wave plate interposed between the first and second lenticular lens sheets, which rotates a polarization of an incident light beam;
a first electro-optical medium and a second electro-optical medium disposed in a space between the first lenticular lens sheet and the wave plate and a space between the second lenticular lens sheet and the wave plate, respectively, wherein the first and second electro-optical media have refractive indices with respect to extraordinary rays that vary according to whether electric fields are applied to the first and second electro-optical media; and
transparent electrodes which apply electric fields to the first and second electro-optical media, and
wherein the lenticular unit has a two-dimensional mode and a three-dimensional mode, and in the two-dimensional mode, the lenticular unit transmits the image from the display panel as a single image, and in the three-dimensional mode, the lenticular unit separates the image from the display panel into a right-eye image and a left-eye image;
wherein when no electric fields are applied to the first and second electro-optical media, molecules within the first electro-optical medium are oriented parallel to the polarization of ordinary rays and perpendicular to the polarization of extraordinary rays, and molecules within the second electro-optical medium are oriented perpendicular to the polarization direction of the ordinary rays and parallel to the polarization of the extraordinary rays;
wherein when electric fields are applied to the first and second electro-optical media, the first and second electro-optical media are oriented perpendicular to both the polarizations of the extraordinary and ordinary rays;
wherein a non-zero-electrical field is applied for achieving the two-dimensional mode; and
wherein a zero electrical field is applied for achieving the three-dimensional mode.

24. A display apparatus comprising:
a display panel which provides an image; and
a lenticular unit which transmits the image provided by the display panel wherein the lenticular unit comprises:
a first lenticular lens sheet and a second lenticular lens sheet disposed so that lens sides of the first and second lenticular lens sheets face each other;
a transparent plate interposed between the first and second lenticular lens sheets; a first electro-optical medium and a second electro-optical medium disposed in a space between the first lenticular lens sheet and the transparent plate and a space between the second lenticular lens sheet and the transparent plate, respectively; and
transparent electrodes which apply electric fields to the first and second electro-optical media, wherein when no electric fields are applied to the first and second electro-optical media, molecules of the first electro-optical medium are oriented perpendicular to molecules of the second electro optical medium, wherein the lenticular unit has a two-dimensional mode and a three-dimensional mode, and in the two-dimensional mode, the lenticular unit transmits the image from the display panel as a single image, and in the three-dimensional mode, the lenticular unit separates the image from the display panel into a right-eye image and a left-eye image;

wherein when electric fields are applied to the first and second electro-optical media the molecules of the first and second electro-optical media are oriented perpendicular to both the polarizations of the extraordinary and ordinary rays;

wherein a non-zero-electrical field is applied for achieving the two-dimensional mode; and Wherein a zero electrical filed is applied for achieving the three-dimensional mode.

25. A display apparatus comprising:

a display panel which provides an image; and a lenticular unit which transmits the image provided by the display panel, wherein the lenticular unit comprises:
  a first flat-surfaced lens plate and a second flat-surfaced plate disposed in parallel to face each other;
  a wave plate interposed between the first and second flat-surfaced plates, which rotates a polarization of an incident light beam;
  a first electro-optical medium and a second electro-optical medium disposed in a space between the first flat-surfaced plate and the wave plate and a space between the second flat-surfaced plate and the wave plate, respectively, wherein the first and second electro-optical media have refractive indices with respect to extraordinary rays that vary according to intensities of electric fields applied to the first and second electro-optical media; and
  transparent electrodes, formed on both surfaces of the wave plate and on the first and second flat-surfaced plates, which form an electric field gradient having a symmetrical distribution within each of the first and second electro-optical media, wherein the lenticular unit has a two-dimensional mode and a three-dimensional mode, and in the two-dimensional mode, the lenticular unit transmits the image from the display panel as a single image, and in the three-dimensional mode, the lenticular unit separates the image from the display panel into a right-eye image and a left-eye image;

wherein when no electric fields are applied to the first and second electro-optical media, molecules within the first electro-optical medium are oriented parallel to the polarization of ordinary rays and perpendicular to the polarization of extraordinary rays, and molecules within the second electro-optical medium are oriented perpendicular to the polarization direction of the ordinary rays and parallel to the polarization of the extraordinary rays;

wherein when electric fields are applied to the first and second electro-optical media, the first and second electro-optical media are oriented perpendicular to both the polarizations of the extraordinary and ordinary rays;

wherein a zero-electrical field is applied for achieving the two-dimensional mode; and wherein a non-zero electrical field is applied for achieving the three-dimensional mode.

26. A two-dimensional/three-dimensional (2D/3D) switchable autostereoscopic display apparatus comprising:

a lenticular unit comprising:
  a first lenticular lens sheet and a second lenticular lens sheet disposed so that lens sides of the first and second lenticular lens sheets face each other;
  a half-wave plate, interposed between the first and second lenticular lens sheets, which rotates the polarization of an incident light beam by 90 degrees;
  a first electro-optical medium and a second electro-optical medium disposed in a space between the first lenticular lens sheet and the half-wave plate and a space between the second lenticular lens sheet and the half-wave plate, respectively, wherein the first and second electro-optical media have refractive indices with respect to extraordinary rays that vary according to whether or not electric fields are applied to the first and second electro-optical media; and
  transparent electrodes which apply electric fields to the first and second electro-optical medial wherein the lenticular unit has a two-dimensional mode and a three-dimensional mode, and in the two-dimensional mode, the lenticular unit transmits the image from a display panel as a single image, and in the three-dimensional mode, the lenticular unit separates the image from the display panel into a right-eye image and a left-eye image;

wherein when no electric fields are applied to the first and second electro-optical media, molecules within the first electro-optical medium are oriented parallel to the polarization of ordinary rays and perpendicular to the polarization of extraordinary rays, and molecules within the second electro-optical medium are oriented perpendicular to the polarization direction of the ordinary rays and parallel to the polarization of the extraordinary rays;

wherein when electric fields are applied to the first and second electro-optical media, the first and second electro-optical media are oriented perpendicular to both the polarizations of the extraordinary and ordinary rays;

wherein a non-zero-electrical field is applied for achieving the two-dimensional mode; and wherein a zero electrical field is applied for achieving the three-dimensional mode.

* * * * *